(12) United States Patent
Abdel-Baset

(10) Patent No.: US 10,940,724 B2
(45) Date of Patent: Mar. 9, 2021

(54) AIR INDUCTION SYSTEM FOR A WHEEL BASED SELF INFLATION TIRE SYSTEM

(71) Applicant: Tarek Abdel-Baset, Windsor (CA)

(72) Inventor: Tarek Abdel-Baset, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 310 days.

(21) Appl. No.: 15/973,612

(22) Filed: May 8, 2018

(65) Prior Publication Data

US 2018/0319226 A1 Nov. 8, 2018

Related U.S. Application Data

(60) Provisional application No. 62/503,062, filed on May 8, 2017.

(51) Int. Cl.

| | |
|---|---|
| *B60C 23/12* | (2006.01) |
| *B60C 23/00* | (2006.01) |
| *F16K 31/22* | (2006.01) |
| *B60C 23/04* | (2006.01) |
| *F16K 21/04* | (2006.01) |
| *F16K 17/36* | (2006.01) |
| *B60C 23/10* | (2006.01) |
| *B60C 23/16* | (2006.01) |

(52) U.S. Cl.
CPC ............ *B60C 23/12* (2013.01); *B60C 23/002* (2013.01); *B60C 23/004* (2013.01); *B60C 23/0408* (2013.01); *B60C 23/0494* (2013.01); *B60C 23/0498* (2013.01); *B60C 23/10* (2013.01); *B60C 23/16* (2013.01); *F16K 17/366* (2013.01); *F16K 21/04* (2013.01); *F16K 31/22* (2013.01); *B60C 23/041* (2013.01); *B60C 23/0447* (2013.01); *B60C 2200/14* (2013.01)

(58) Field of Classification Search
CPC ..................................................... B60C 23/12
See application file for complete search history.

(56) References Cited

U.S. PATENT DOCUMENTS

| | | |
|---|---|---|
| 5,042,994 A | 8/1991 | Smolarek |
| 5,325,902 A | 7/1994 | Loewe et al. |
| 5,413,159 A | 5/1995 | Olney et al. |
| 5,616,196 A | 4/1997 | Loewe |
| 5,928,444 A | 7/1999 | Loewe et al. |
| 6,098,682 A | 8/2000 | Kis |
| 6,533,010 B1 | 3/2003 | Aionso et al. |
| 7,690,411 B2 | 4/2010 | Wilson |

(Continued)

OTHER PUBLICATIONS

International Search Report and Written Opinion dated Sep. 19, 2018 for International Application No. PCT/US2018/031607, International Filing Date May 8, 2018.

*Primary Examiner* — Jason R Bellinger
(74) *Attorney, Agent, or Firm* — Ralph E Smith

(57) ABSTRACT

An air induction system for filtering a compressible fluid to an electromechanical component mounted on a wheel of a vehicle. The system may make use of a first plurality of float valves arranged in series in a non-linear first flowpath path, with at least one of the float valves forming an inlet for intaking the compressible fluid into the first flowpath, and one being in communication with an inlet of the electromechanical component. Each of the float valves may have a buoyant float valve element therein which is responsive to change position when submerged in water, to close off its respective float valve depending on an angular orientation of the wheel, and thus an angular orientation of the float valve.

14 Claims, 19 Drawing Sheets

(56) References Cited

U.S. PATENT DOCUMENTS

| | | |
|---|---|---|
| 7,909,076 B2 | 3/2011 | Wilson |
| 9,630,461 B2 | 4/2017 | Serbu et al. |
| 2011/0203710 A1 | 8/2011 | Hinojosa, Jr. et al. |
| 2014/0271261 A1 | 9/2014 | Boelryk |
| 2015/0375577 A1 | 12/2015 | Serbu et al. |

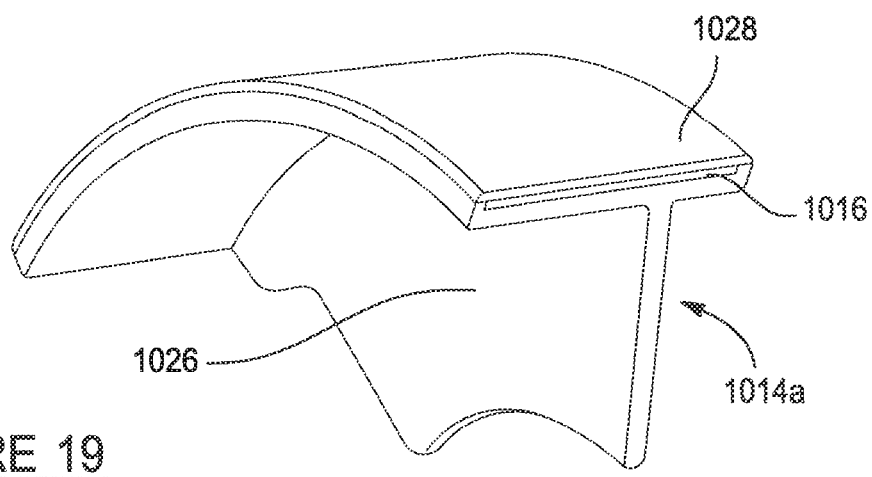
FIGURE 19
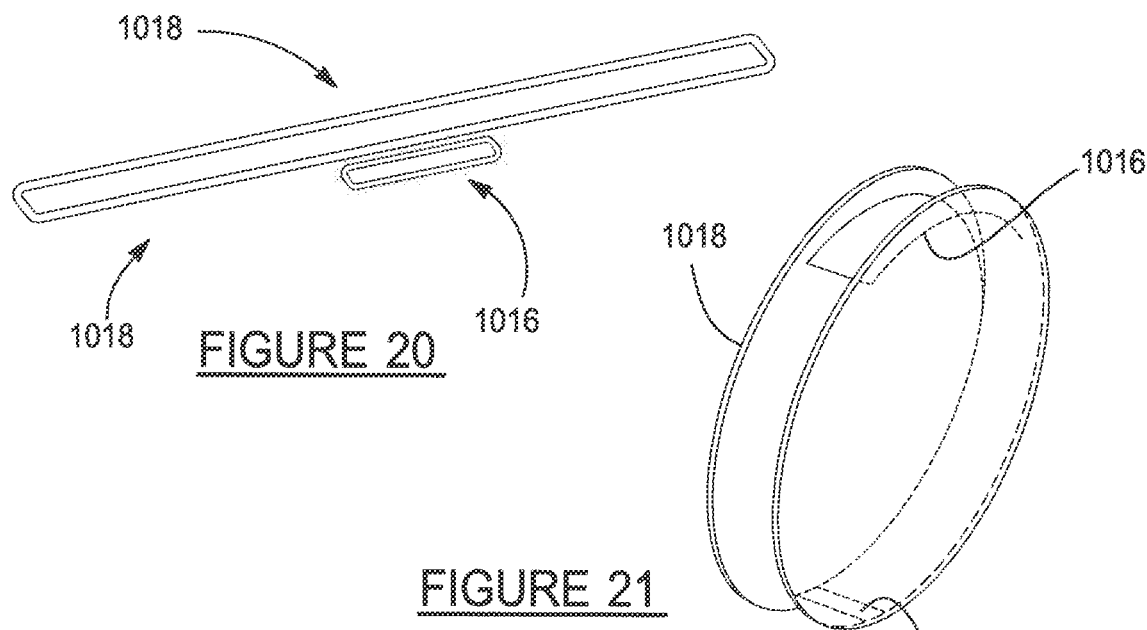
FIGURE 20
FIGURE 21
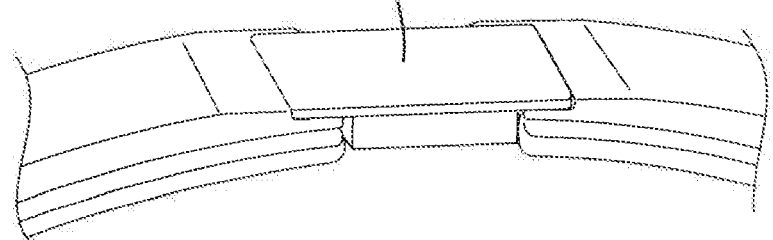
FIGURE 22

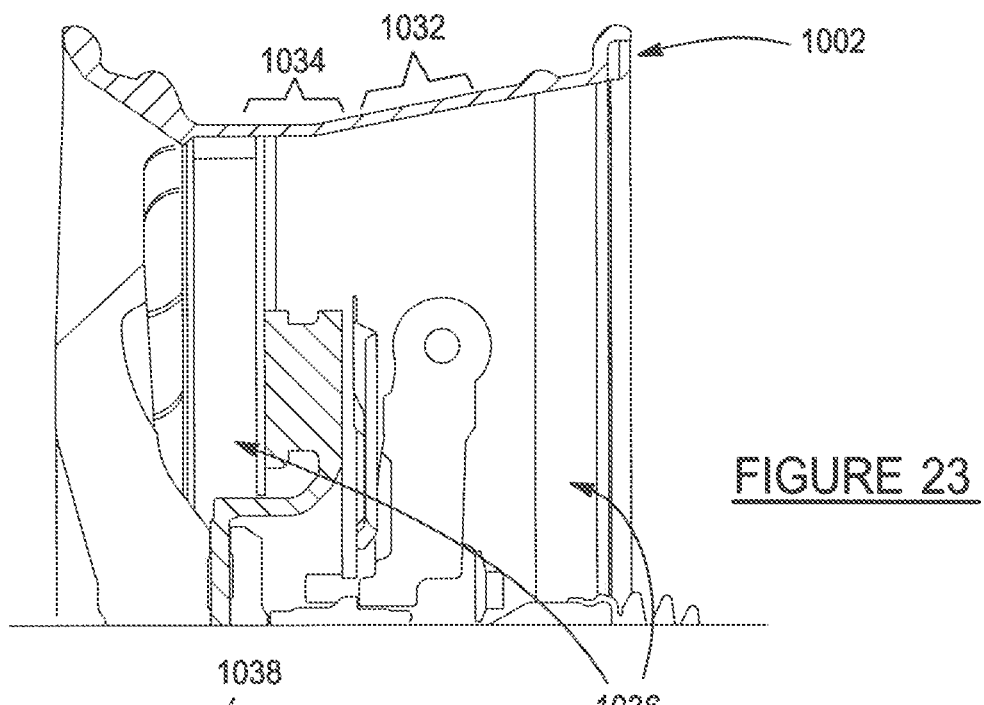
FIGURE 23
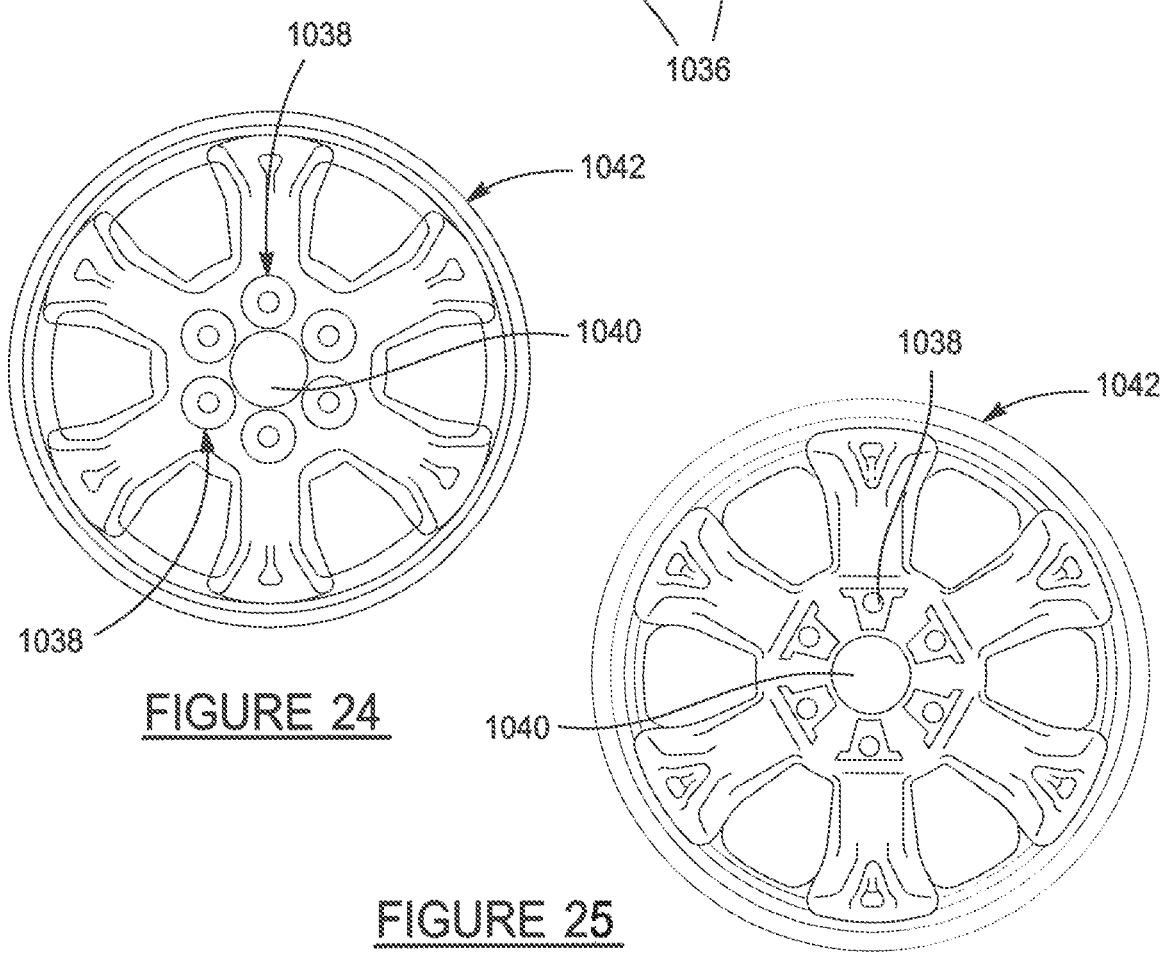
FIGURE 24
FIGURE 25

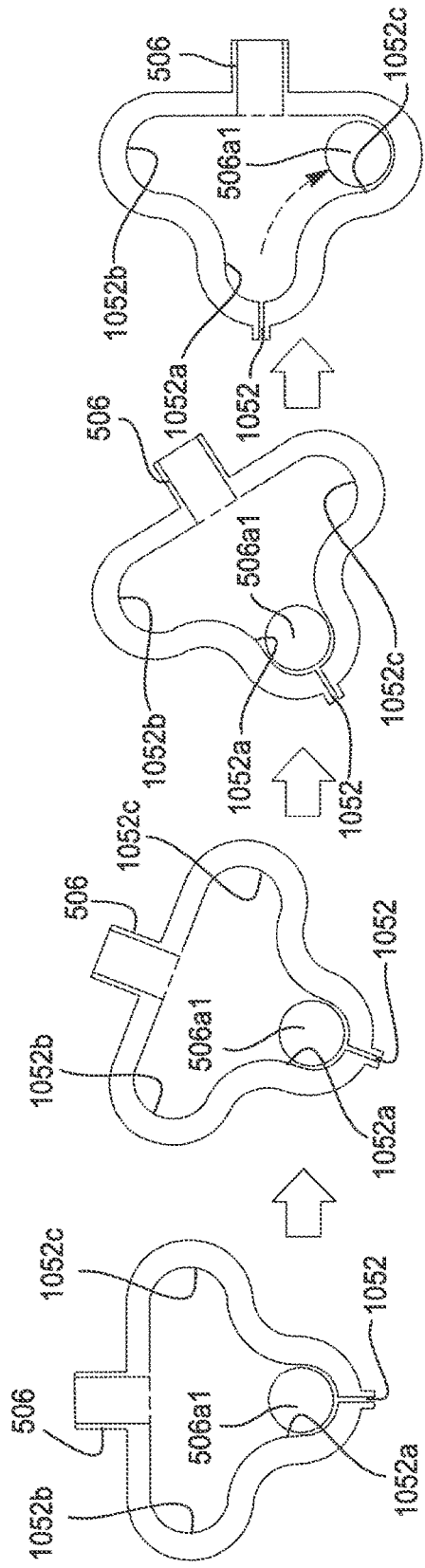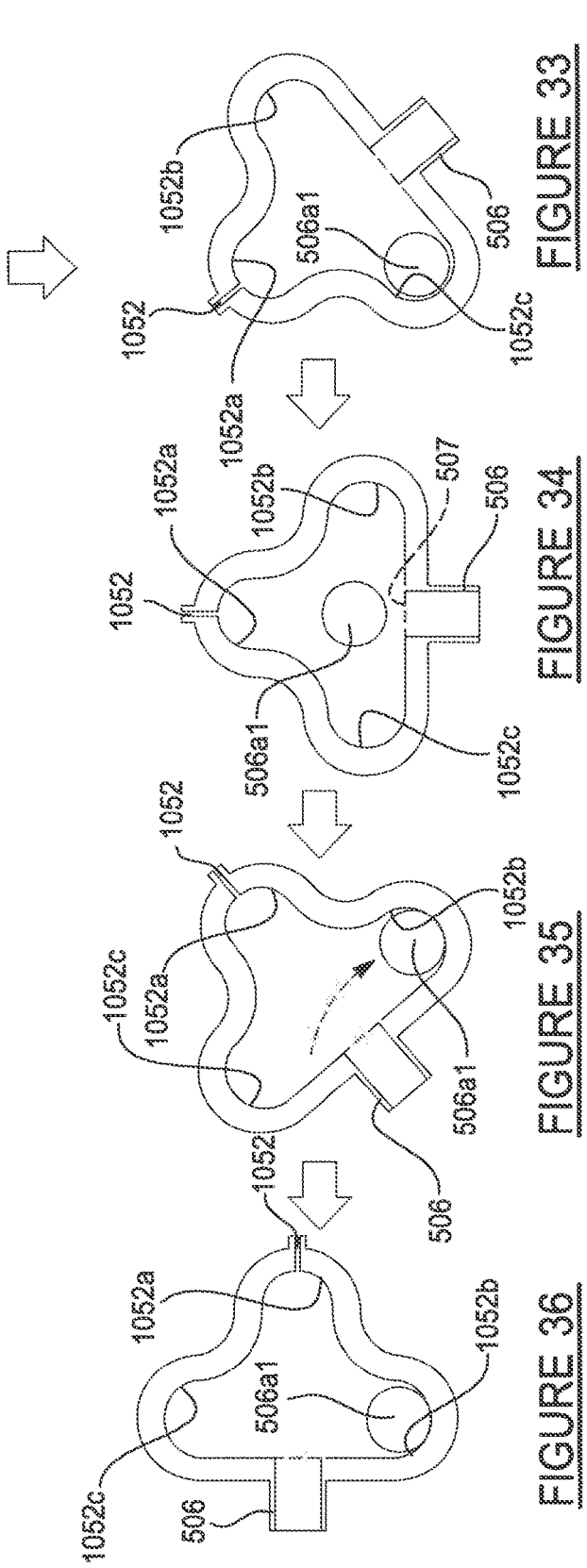

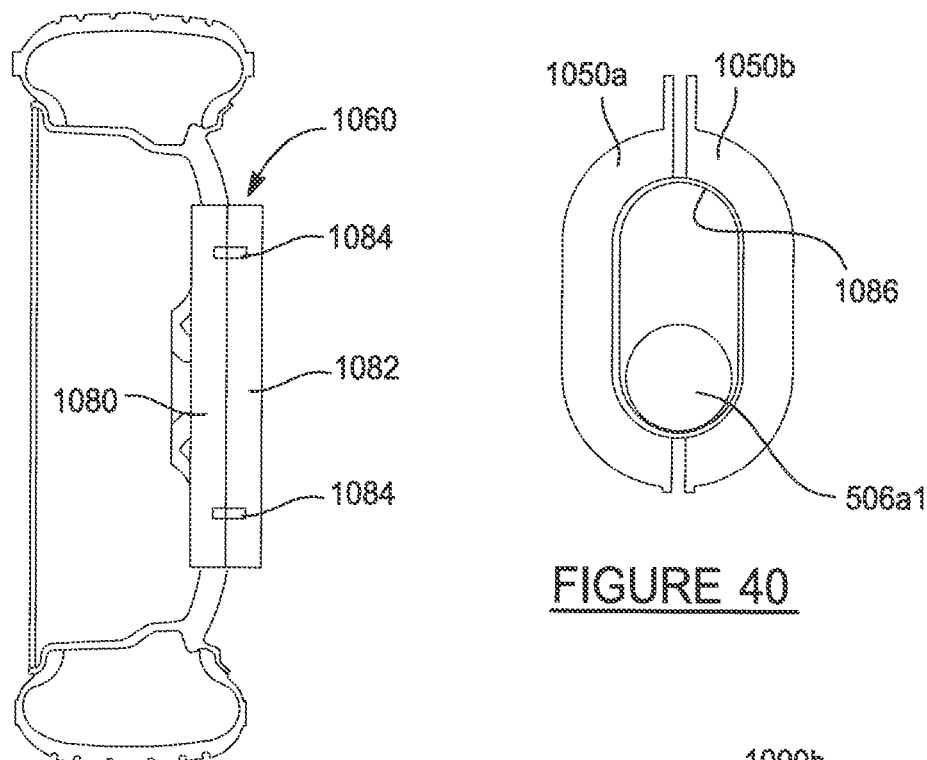
FIGURE 39
FIGURE 40
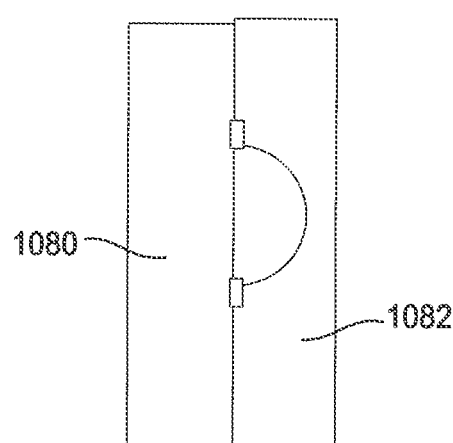
FIGURE 41
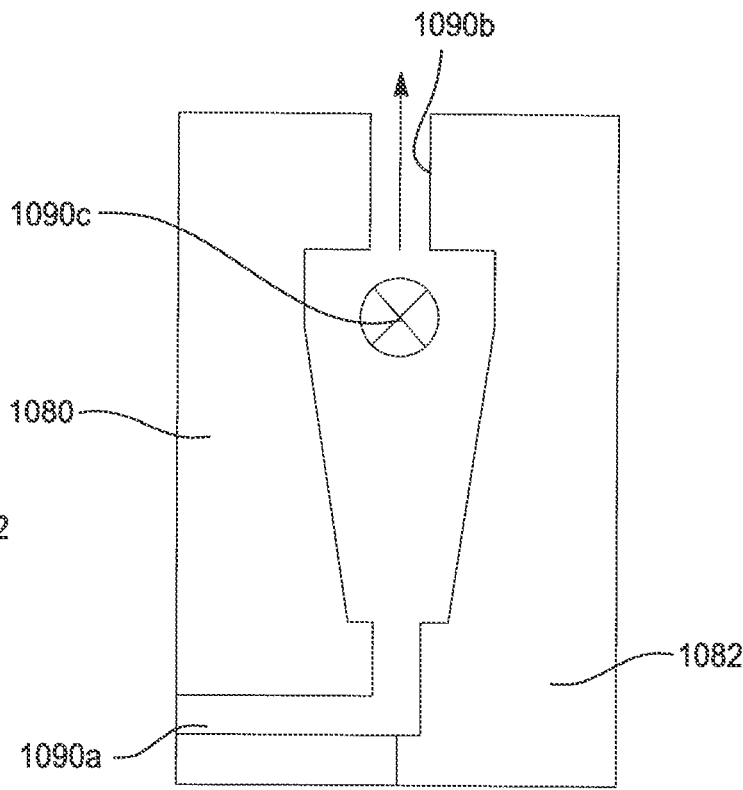
FIGURE 42

AIR INDUCTION SYSTEM FOR A WHEEL BASED SELF INFLATION TIRE SYSTEM

CROSS-REFERENCE TO RELATED APPLICATIONS

This application claims the benefit of U.S. Provisional Application No. 62/503,062, filed on May 8, 2017. The entire disclosure of the above application is incorporated herein by reference.

FIELD

The present disclosure relates to systems and methods for controlling tire pressure in motor vehicles, and more particularly to an air induction system for use with a tire pressure inflation/deflation/regulating system and method.

BACKGROUND

The statements in this section merely provide background information related to the present disclosure and may not constitute prior art.

Tire inflation systems for motor vehicles such as cars, trucks, jeeps, SUVs, etc. sometimes make use of an air compressor which is mounted somewhere on the vehicle. The operator of the vehicle typically manually uses an air hose attached to an output port of the air compressor to manually inflate the tire on each wheel of the vehicle if air pressure in the tire is not at an appropriate level. This is particularly so with vehicle operators who take their vehicles off-road, and who need to "air down" the tires of their vehicle for optimum traction. Re-inflating the tires using the compressor carried on the vehicle can be a time consuming and laborious process.

Automatic tire pressure regulation systems currently exist. These systems are typically referred to as "Central Tire Inflation" (CTI) systems. The compressors and tanks are centrally located in one section of the vehicle with air lines plumbed to all four wheels. These systems, however, must transfer air pressure from a non-moving/rotating part of the vehicle to the rotating wheels via a slip seal. These slip seals cause undesirable frictional drag (poor for fuel economy), are generally expensive, and often require prohibitive levels of maintenance/service.

Another recognized challenge with automatic tire pressure regulation systems is the need to provide clean air to the air compressor input. Dirt, mud, water, snow and other contaminants can clog the air intake to the air compressor and potentially damage the air compressor. This has limited previously developed tire inflation systems to using an air compressor located in such a manner that minimizes the risk of entry of mud, water, snow, and road contaminants into the air compressor.

Accordingly, a system which is able to provide the same functionality as currently available CTI systems, but without the draw backs of slip seals would be highly desirable.

SUMMARY

This section provides a general summary of the disclosure, and is not a comprehensive disclosure of its full scope or all of its features.

In one aspect the present disclosure relates to an air induction system for filtering a compressible fluid to an electromechanical component mounted on a wheel of a vehicle. The system may comprise a first plurality of float valves arranged in series in a first flowpath, with at least one of the float valves forming an inlet for intaking the compressible fluid into the first flowpath, and one being in communication with an inlet (504) of the electromechanical component. Each of the float valves may have a buoyant float valve element therein responsive to change position when submerged in water, to close off its respective said float valve depending on an angular orientation of said wheel, and thus an angular orientation of said float valve.

In another aspect the present disclosure relates to a method of controlling an admission of air into an inlet of an electromechanical component mounted on a vehicle wheel. The method may comprise arranging a first plurality of float valves in series in a non-linear path on the wheel, such that a first one of the first plurality of float valves forms an inlet for intaking air from an ambient environment, and a last one of the first plurality of float valves communicates with the inlet of the electromechanical component. The method may further include arranging the first plurality of float valves such that adjacent pairs of the first plurality of float valves are differently angularly positioned with respect to one another. The method may further include using the selected ones of the float valves to interrupt the flow of air into the electromechanical component depending on an angular orientation of the wheel.

In still another aspect the present disclosure relates to a system which may comprise a wheel, an air compressor mounted on the wheel, and an air induction system. The air compressor may have an inlet, and the air induction system may be mounted on the wheel for controlling an admission of air from an ambient environment into the inlet of the air compressor. The air induction system may include a plurality of float valves supported on the wheel and arranged in a non-linear flow path such that the admission of air into the wheel rim is blocked when the wheel is submerged in a fluid.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 19 is an enlarged perspective of a modified dust shield that is configured to carry the source coil of the wireless power transfer system;

FIG. 20 is a perspective view of the receiver coil and the source coil with both coils extended in a planar configuration;

FIG. 21 shows a simplified perspective view of the source coil positioned in relation to the receiver coil, and illustrating the gap which is formed between free ends of the receiver coil;

FIG. 22 shows a perspective view of a portion of the receiver coil with a receiver coil sending unit positioned in the gap;

FIG. 23 shows a portion of a cross section of a wheel to illustrate a clearance present between the receiver coil and various portions of the wheel where clearance is needed for other components mounted on the wheel;

FIGS. 24 and 25 illustrate preferred mounting locations for various components on outside and inside areas of the wheel;

FIGS. 29-36 show how different pockets of the float valve capture the float ball depending on the angular orientation of the float valve, with the outlet of the float valve being sealed in FIGS. 29-31, and open in FIGS. 32-36;

FIG. 39 is a simplified side cross sectional view of a wheel/tire combination illustrating how the air induction system may be formed using two clamshell halves releasably secured together to permit easy access to the float balls, such as for cleaning, maintenance or repair;

FIG. 40 shows another embodiment of the float valve which incorporates a full cage for holding the float ball, with the cage being shaped to reside within an interior area formed by the two clamshell halves;

FIG. 41 shows another embodiment of the two-piece clamshell construction of FIG. 39, but with the contours and pockets formed in one of the two clamshell halves to ease in manufacturing the assembly; and FIG. 42 is a simplified diagram illustrating how the vortex filter may be formed by the two clamshell halves of FIG. 39.

DETAILED DESCRIPTION

Figure 1:
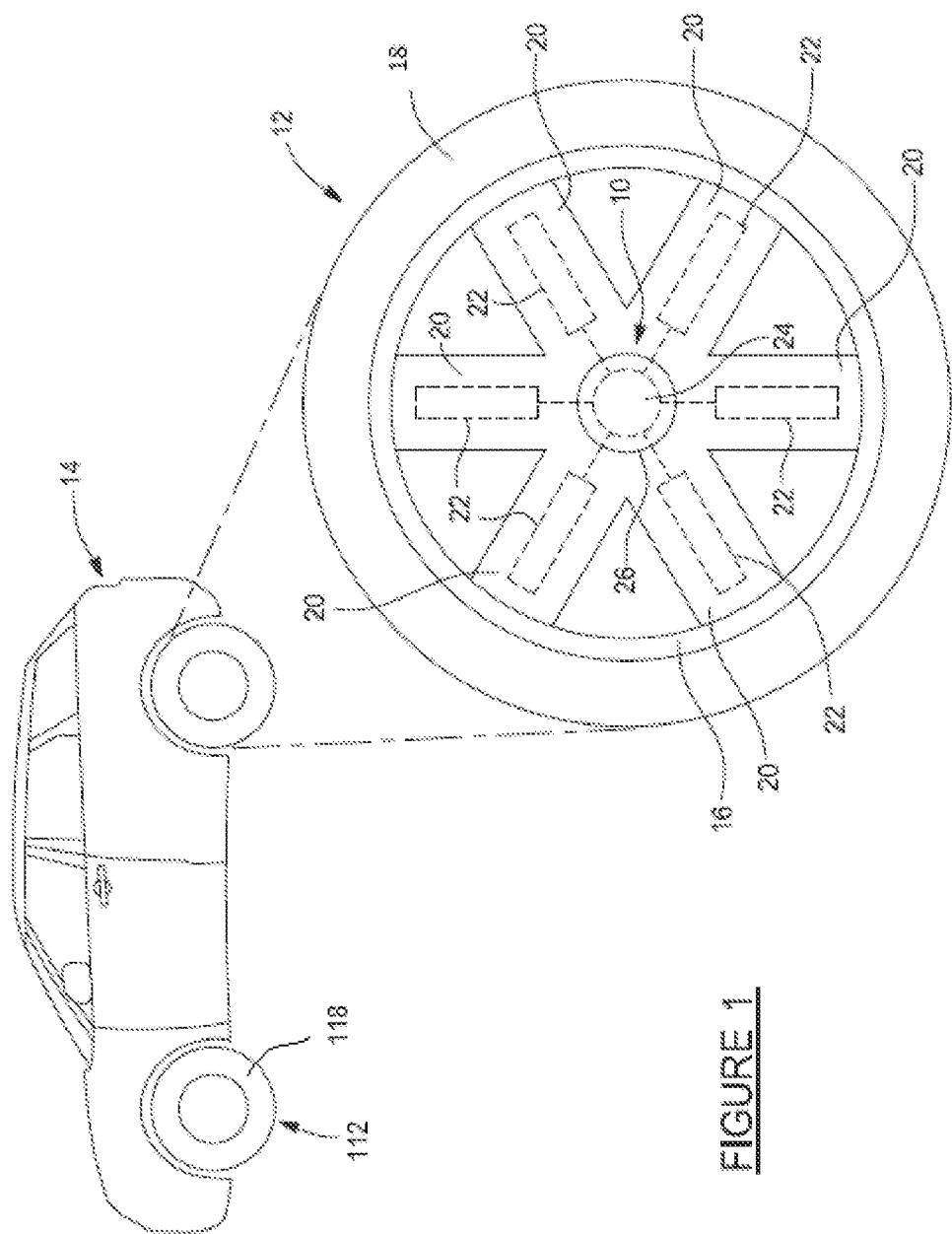
FIG. 1 illustrates in high level fashion a tire pressure inflation/deflation/regulation system that is integrated into a wheel.

The following description is merely exemplary in nature and is not intended to limit the present disclosure, application, or uses. It should be understood that throughout the drawings, corresponding reference numerals indicate like or corresponding parts and features.

Referring to FIG. 1, one embodiment of a tire pressure self-inflation/deflation/regulating system 10 (hereinafter simply "system 10") is shown integrated into a wheel 12 of a vehicle 14. While only one wheel 12 is shown, it will be appreciated that the system 10 may be integrated into all four wheels of the vehicle 14, and all of the wheels 12 of the vehicle may be constructed in the manner discussed below.

The wheel 12 includes a rim 16 and a tire 18. The rim 16 in this example includes six distinct spokes 20, although the system 10 is not limited to use with only six-spoke wheels. The system 10 may be integrated into wheels of virtually any design, regardless of whether the wheels incorporate spokes or not. For this example, however, the following discussion will focus on a six-spoke wheel, where each spoke has a hollow recessed area on its back side forming a distinct compartment.

The system 10 in this example includes an air storage canister 22 that may be located in the hollow compartment of each spoke 20 of the rim 16. A micro-compressor 24 may be disposed on the rim 16, for example at a center or hub area 26 of the rim 16, and may be in fluid communication with each of the storage canisters 22. Optionally, or in addition to the storage canisters 22, each of the micro-compressors 24 may include its own air canister. Still further, the system may forego the use of one or more canisters and rely strictly on the micro-compressor 24 in each rim 16 to provide pressurized air.

The system 10 is shown in FIG. 1 as having the micro-compressor 24 mounted at the center or hub area 26 of the rim 16, although it will be appreciated that other mounting locations for the micro-compressor 24 on the rim 16 are equally applicable. The micro-compressor 24 enables "self-inflation" of the tire 18. By "self-inflation" it is meant that no external or remote pressurized air source or remote air compressor is required to be connected to the tire 18 to inflate it. The tire 18 may also be controllably deflated to a desired pressure upon a command from the user through a user input control, which will be discussed in the following paragraphs.

In one embodiment of the system 10 the storage canisters 22 allow nearly instant filling of the tire 18 by collectively providing about 0.75 L of storage capacity at about 350 psig. For example, with a 5 spoke rim, each spoke may have about 0.125 L of storage capacity. The 6 spoke rim 16 shown in FIG. 1 may provide about 0.125 L of storage capacity per spoke. Of course, these storage capacities could vary considerably depending upon the size of the wheel/tire, with larger tires and/or lower storage pressure obviously necessitating a greater storage capacity than smaller tires. But for a tire mounted on an 18 inch wheel, typically about 0.75 L at 350 psi will provide sufficient storage capacity to fully inflate the tire 18.

As will be explained in greater detail in the following paragraphs, the system 10 also allows the user to deflate each tire 18 of the vehicle 14 without exiting the vehicle and manually opening the valve in the stem of the tire 18, as is commonly done when the user desires to "air down" the tires of the vehicle, such as in preparation for off-road driving. Thus, both deflation of each of the tires 18 and re-inflating of each of the tires 18 back up to its recommended tire pressure can be achieved without the user having to exit the vehicle 14 and hook up an air line to the tire from a remote pressurized air source or an air compressor (either portable or on-vehicle mounted).

Figure 2:
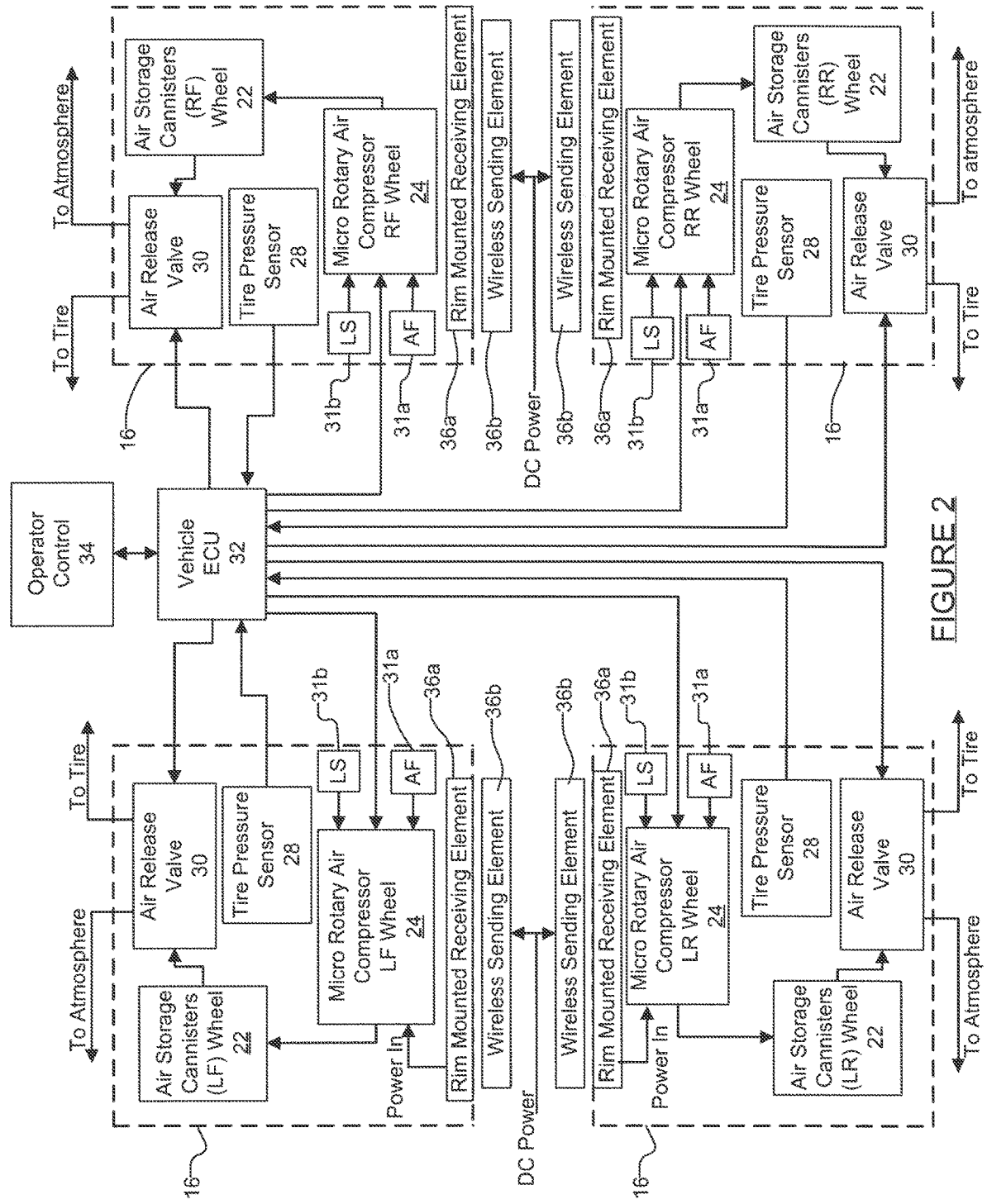
FIG. 2 is a more detailed, high level block diagram of the system shown in FIG. 1 along with other components that are used to help control the deflation and re-inflation of each tire.

FIG. 2 shows a more detailed block diagram of one embodiment of the system 10 which incorporates the plurality of air canisters 22 for storing pressurized air, as well as the micro-compressors 24. Again, it will be understood that the use of the air canisters 22 is optional but for the purpose of the following discussion it will be assumed that they are included. If the air canisters 22 are not used, then the rim 16 may be formed to have a plurality of distinct areas that may be used as fluid storage areas, into which air or another fluid may be pumped into and held. Merely for convenience, the following discussion will reference the air canisters 22 being used in the system 10, with it being understood that this is just one possible implementation of the system 10.

In the example embodiment shown in FIG. 2, each rim 16 further may include a tire pressure sensor 28 and an electrically controlled solenoid valve that forms an air release valve 30. The air release valve 30 may be integrated into the valve stem of the rim 16 or it may form a fully independent valve, but in either event it is able to receive and be controlled by an electrical signal. Optionally, an air filter 31a and a liquid separator 31b may be arranged upstream of the micro-compressor 24 in each rim. It should also be appreciated that while the air filter 31a and the liquid separator 31b are shown as being in series with one another, it is also possible that they could be configured in parallel, although it is expected that in most implementations it will be more advantageous to have a series arrangement of these two components.

A vehicle electronics control unit (ECU) 32 may receive inputs from each of the tire pressure sensors 28 and may generate output signals for controlling operation of the micro-compressors 24 and the air release valves 30. Optionally, the ECU 32 may also receive other signals such as temperature, compressor current, wheel rotation speed, moisture, etc. An operator control 34 enables a user to command a deflation operation or an inflation operation. For example, the operator control 34 may enable the user to select a tire pressure, either directly or by selecting from a plurality of presets tire pressure values, to which the pressure of one, or all, of the tires 18 may be reduced to, and may then display on the vehicle's center stack display (or on a different in-vehicle display) a status report letting the user know how the deflation or inflation operation is proceeding. The tire pressure of the four wheels of the vehicle may be controlled independently by the ECU 32, or alternatively the front wheels could be controlled together and/or the rear wheels could be controlled together. The ECU 32 may be programmed to suspend tire pressure warnings to the user when the user is commanding a tire deflation operation and operating on partially deflated tires. Still further, the operator control 34 may enable the user to select a specific tire pressure to which one or all of the tires may be re-inflated to, or alternatively may provide a plurality of preset tire pressures from which the user selects. In either event, the operator control 34 provides suitable signals to the ECU 32 to cause the ECU 32 to implement either a tire deflation operation or a tire inflation operation. If a tire deflation operation is implemented, the ECU may open the air release valves 30 until the tire pressure sensor 28 of each rim 16 indicates to the ECU that a user selected tire pressure has been reached at the rim. If a re-inflation operation is implemented, the ECU 32 may control the micro-compressors 24 to re-inflate each tire 18 until the tire pressure sensors 28 indicate that a selected (or possibly preset) tire pressure has been reached, which corresponds to a properly inflated tire. In one embodiment, all of the tires 18 of the vehicle 14 may be fully inflated by the system 10 within about 5-15 minutes, and conversely the tires may be deflated by the system to a minimum predetermined value (e.g., 5 psi) within about 3 minutes.

The system 10 may also incorporate a rim 16 mounted receiving element 36a and a stationary mounted wireless sending element 36b. The elements 36a and 36b may be part of a wireless capacitive or inductive charging system. Each of the wireless sending elements 36b may receive a DC voltage signal, for example +12VDC from the vehicle's 14 battery or electrical system, so that DC power can be wirelessly transmitted from each sending element 36b to its respective rim mounted receiving element 36a. Each rim mounted receiving element 36a may thus wirelessly supply DC charging power to its respective micro-compressor 24 or possibly to a battery (not shown) which may also be carried on the rim 16. A suitable switch or switching system (not shown) may be interposed between the DC power being applied to each wireless sending element 36b and the ECU 32 so that the ECU can control when power is being applied to and removed from each micro-compressor 24.

The application of DC power to each rim 16 can also be used for other purposes besides powering the micro-compressors 24. For example, the power provided to each rim 16 may be used to power lights, vents, sensors, or virtually any other component that is supported on the rim 16 that requires electrical power for its operation. And while the charging signal has been described above as a +12VDC signal, it will be appreciated that a wide range of other voltages could be used instead of +12VDC. As such, the system 10 is not limited to use with any one specific voltage.

Figure 3:
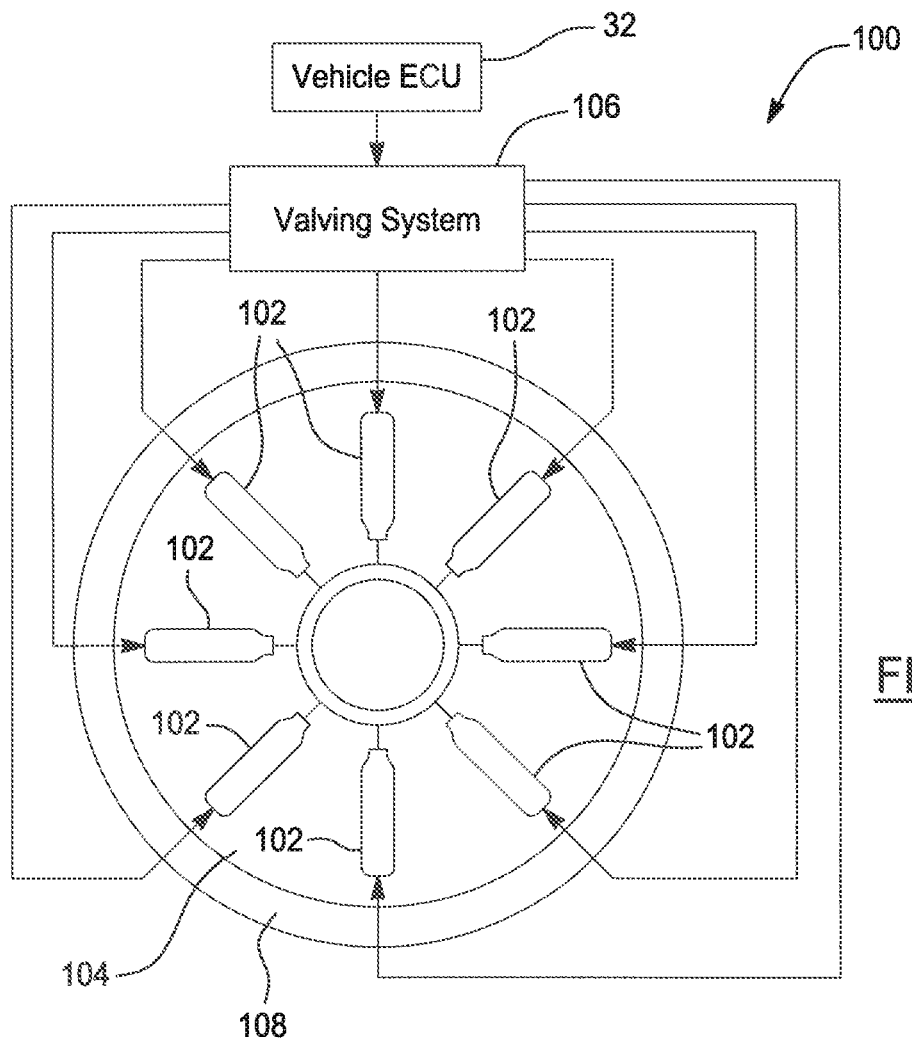
FIG. 3 is a plan view of a wheel in accordance with another embodiment of the present disclosure where the wheel incorporates a plurality of single-use $CO_2$ cartridges for enabling self-inflation of the tire.

Referring to FIG. 3, a system 100 in accordance with another embodiment of the present disclosure is shown. In this embodiment the system 100 makes use of a plurality of disposable (i.e., one-time use) compressed gas cartridges, which in this example are shown as $CO_2$ cartridges 102. However, the gas used could be pure or un-pure, such as air/$CO_2$, $N_2$, etc., and therefore the system 100 is not limited to use with any specific form of gas. For this example, however, reference will be made to the use of $CO_2$ as the specific compressed gas that is used.

The $CO_2$ cartridges 102 may be contained in the recesses associated with the spokes of a rim 104. While eight $CO_2$ 102 cartridges are shown corresponding to an eight-spoke rim 104, it will be appreciated that a greater or lesser number of $CO_2$ cartridges could be used depending on the design of the rim. For example, even a single $CO_2$ cartridge having a donut like shape, and the capacity of a plurality of individual $CO_2$ cartridges, could be used if the wheel design will accommodate such a configuration. And as noted above, compressed nitrogen dioxide ($NO_2$) or any other suitable gas mix may be used in place of $CO_2$.

A valving system 106 may be controlled by the ECU 32 to enable the $CO_2$ cartridges 102 to release their pressurized fluid into a tire 108 mounted on the rim 104 to re-inflate the tire. The $CO_2$ cartridges 102 may be sized to hold sufficient quantities of compressed $CO_2$ gas to enable an approximate specified number of re-inflations of the tire 108 to be performed, although it will be appreciated that this number of re-inflations will vary depending on how far the tire is aired down. A user that periodically airs down the tire 108 from 40 psi to 20 psi will be able to re-inflate the tire 108 using a given set of $CO_2$ cartridges a greater number of times than a user who is airing down the tire 108 to 10 psi. The vehicle ECU 32 could also be programmed to automatically release compressed gas from the $CO_2$ cartridges 102 if the tire pressure drops below a predetermined level without the ECU 32 having received a command from the user.

Figure 4:
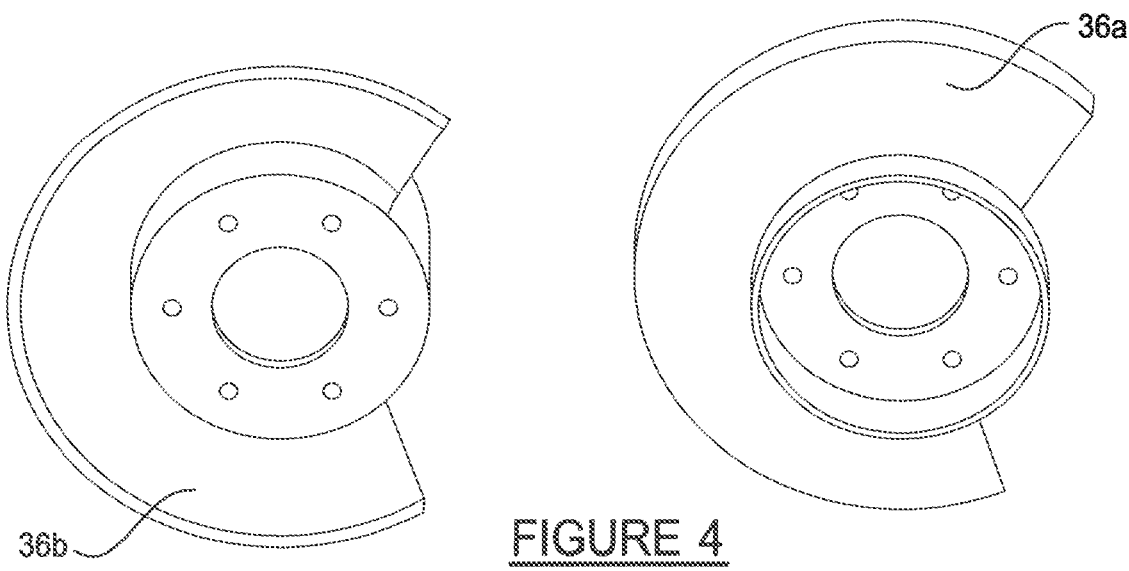
FIG. 4 is a simplified perspective view of first and second hub-like, inductive charging components that may be coupled in a spaced apart relationship over one another to enable an inductive charging current to be applied to electrically powered components within the wheel.

FIG. 4 illustrates one embodiment of the rim mounted receiving element 36a and one embodiment of the sending element 36b that form the wireless charging system. The rim mounted receiving element 36a may be fixedly secured to the rim 16 (FIG. 1) and rotates with the rim. The sending element 36b may be supported on the wheel hub, caliper or even wheel dust cover (i.e., essentially any suspension component that is in a fixed position relative to the wheel orientation). Advantageously, wireless charging may be accomplished whether the vehicle 14 is stationary or in motion. The sending element 36b in this example has a donut shape and the rim mounted receiving element 36a has a complementary shape that enables it to be positioned closely adjacent the sending element 36b without making physical contact with the sending element 36b. In one embodiment the sending element 36b has an outer diameter of about 19.0" (48.2 cm), although this may vary considerably depending on the specific vehicle that the components 36a/36b are implemented on, as well as the desired amount of power that needs to be supplied to power the micro-compressors 24, sensors 28 and any other electronic components associated with the rim 16. In one embodiment the rim mounted receiving element 36a and the sending element 36b may provide about 50 watts of charging power per rim 16, although it will be appreciated that this figure may vary significantly, depending in part on the number of electrical components located on the rim 16 that require DC power.

Figure 5:
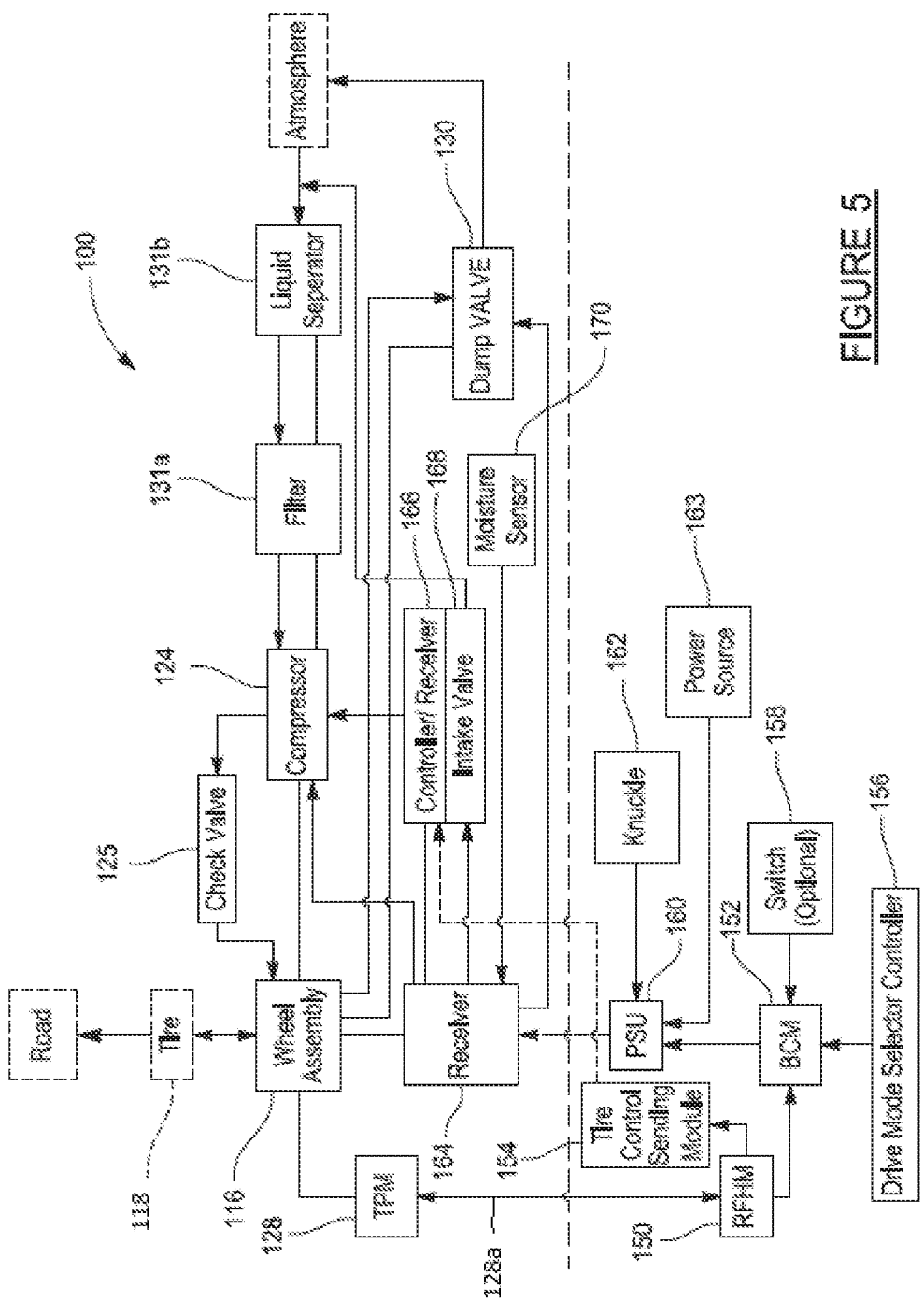
FIG. 5 is a block diagram of an in-wheel inflation and control system in accordance with another embodiment of the present disclosure.

Referring now to FIG. 5, another embodiment of an in-wheel inflation system 100 is shown. Components in common with the system 10 are identified by reference numbers increased by 100 over those used to describe the system 10. It will be appreciated that the system 100 is associated with one wheel 112 and one tire 118 of the vehicle 14 (FIG. 1). The system 100 will therefore be present on each wheel of the vehicle 14 that where one desires to be able to controllably inflate and/or deflate the tire associated with the wheel. In most instances, it is expected that all four wheels of the vehicle will include a separate instance of the system 100 (i.e., identical systems 100 will be present at all four wheels of the vehicle 14).

The system 100 in this example includes the wheel assembly 116 on which a micro rotary air compressor 124 (hereinafter simply "air compressor" 124) is located. The air compressor 124 may feed pressurized air through a one-way check valve 125 to the wheel assembly 116. A liquid separator 131b may be used to initially separate liquid or moisture from air ingested into an air filter 131a. The air filter 131a may comprise, for example, a vortex type filtration system which filters materials of varying density by inducing a rotational motion on the incoming air stream. Heavier particles are directed to the outer diameter of the air filter 131a and rejected on out the bottom. Clean air near the middle of the air filter 131a may be directed out the top of the filter. Filtered air from the air filter 131a may then be provided to the air compressor 124. The air compressor 124 may supply air directly to inflate the tire 18. Accordingly, it will be appreciated that with the system 100, there is no requirement for a separate air reservoir to be formed, or contained on, the wheel rim 116. The air compressor 124 may be a scroll type compressor capable of a desired output, for example up to or possibly exceeding 50 psi, and having a predetermined maximum power draw. In one example the compressor 124 power draw may be between about 50 W-200 W. However, it will be appreciated that the system 100 is not limited to use with any one type of air compressor having any specific power draw. The performance of the compressor 124 may also be tailored/selected in part based on the specific vehicle that the wheel 12 it is integrated onto will be used with, and the specific performance objectives pertinent to the vehicle.

A tire pressure monitoring ("TPM") subsystem 128 may be used to monitor a tire pressure of the tire 18. An output 128a of the TPM subsystem 128 may be communicated to a radio frequency hub module 150 (hereinafter simply "RFHM" 150). The RFHM 150 is located remote from the wheel 12 (i.e., but still on the vehicle 14).

The RFHM 150 may communicate directly or indirectly with a number of other subsystems or components that are mounted remote from the wheel 12. In FIG. 5, the tire pressure information obtained by the RFHM 150 is provided wirelessly to a body control module 152 (hereinafter "BCM" 152), as well as to a tire control sending module ("TCSM") 154. The BCM 152 forms a primary control module for controlling most vehicle functions and communicates with TCSM 154. The BCM 152 may also communicate with a drive mode selector controller 156 of the vehicle 14 which informs the system 100 of a drive mode that the vehicle is currently in. The BCM 152 may also receive a signal from an optional switch 158, for example a dedicated button or dial for enabling control of the system 100 through another component.

On the vehicle 14 side, the BCM 152 may be used to feed a signal to a power sending unit 160 (hereinafter "PSU" 160). The PSU 160 may be used to send power wirelessly, such as by an inductive coupling method, to the wheel 12 for use by the electronic components and subsystems carried on the wheel. The PSU 160 may be located at any convenient location on the vehicle 14, but in one preferred implementation the PSU 160 on a steering knuckle 162 of the vehicle 14 or any other suitable location. The PSU 160 may receive power from a power source 163, which may be, for example, a +48VDC power source, +12VDC power source, a +5VDC power source, or other power source.

The PSU 160 may be used to wirelessly communicate with a receiver 164 mounted on the wheel 116. The receiver 164 may be used to relay communications and/or commands to a controller/receiver 166, an air intake valve 168 and a moisture sensor 170. The air intake valve could also be an electronic solenoid valve. Optionally, it is possible that the dump valve 130 and the intake valve could be integrated together into a single, multi-purpose valve assembly.

The receiver 164 may also send commands to a dump valve 130, which may comprise an electronic solenoid valve. The dump valve 130 may also receive signals from other components on the wheel 116, for example air pressure signals relating to an air pressure within the tire 18. The dump valve 130 may supply signals to other components, for example an exhaust air pressure signal to one or more components on the wheel 116.

The controller/receiver 166 may be used to control the air intake valve 168 to admit air from the ambient atmosphere into the liquid separator 131b upon receipt of a suitable command. The command may come from the drive mode selector controller 156, from the optional switch 158, or any other signal source in communication with the system 100. The system 100 may be used to inflate or deflate the tire 18 upon suitable commands from the user which are input to (or relayed by) by the user via the drive mode selector controller 156 and/or the optional switch 158.

Figure 6:
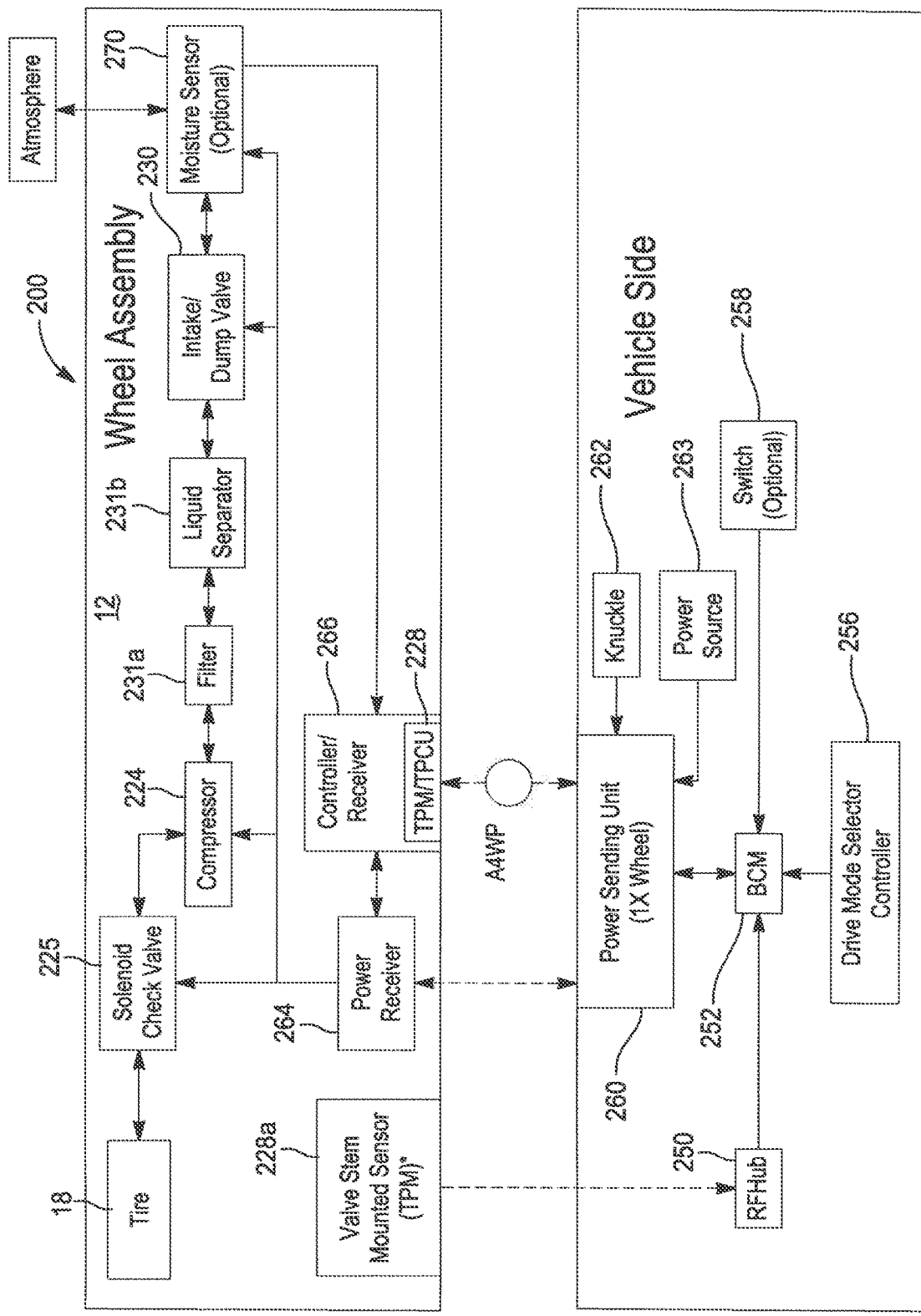
FIG. 6 is a high level block diagram of one embodiment of an in-wheel inflation system of the present disclosure in which the controller/receiver includes an integrated tire pressure monitor/tire pressure control unit (TPM/TPCU)

Referring to FIG. 6, a system 200 in accordance with another embodiment of the present disclosure is shown. System 200 is somewhat similar to system 100, and components/subsystems in common with those of system 100 are denoted by reference numbers increased by 100. For example, while knuckle 262 is not described below relative to FIG. 6, it should be understood that knuckle 262 is similar to knuckle 162 described above.

The system 200 may include on the wheel 12 of the vehicle 14 an electronic, microprocessor based controller/receiver 266 for receiving wireless RF signals, for example wireless RF signals in accordance with the A4WP communications protocol. It is a particular advantage of this embodiment that a dedicated tire pressure monitor and tire pressure control unit subsystem ("TPM/TPCU") 228 is integrated into, and forms a part of, a controller/receiver 266. The wireless communications signals may be from a power sending unit 260 mounted remote from the wheel 12 on a different portion of the vehicle 14.

A separate valve stem mounted tire pressure monitoring component or subsystem 228a is included on the wheel 12 for redundancy and also for compliance with applicable federal regulations. A power receiver 264 receives power wirelessly (e.g., though inductive power transfer) from the PSU 260 and supplies power to a solenoid check valve 225, an micro air compressor 224, an electronic intake/dump valve 230, and a moisture sensor 270. A liquid separator 231b and an air filter 231a may also be included on the wheel 12 to filter and remove moisture from ingested air prior to the ingested air being supplied to the air compressor 224.

On the vehicle 14 side, a radio frequency hub ("RFHUB") 250 is in wireless communication with the valve stem mounted TPM 228a. A body control module ("BCM") may communicate with the RFHUB 250, with a drive mode controller 256 and optionally with a switch 258. The BCM 252 may control the PSU 260, as well as communicate wirelessly with the controller/receiver 266. The PSU 260 may receive DC power from a suitable DC power source 263 (e.g., +12VDC vehicle battery).

The system 200 also takes advantage of a wireless communication protocol "A4WP" that is built into wireless power devices. The wireless power devices incorporate this protocol in order to allow the functionality of the source and receivers to pair to each other and communicate basic level, commands, diagnostics, etc., to each other etc. So the system 200 uses the existing A4WP protocol and adds additional controls to control the entire system. So in effect, PSU 260 is both a wireless power and wireless communication device in for the system 200.

Note also that the decision to act (i.e. purge system or fill system) could be made by the vehicle (using BCM 252) or the TPM/TPCU 228 on the wheel assembly 12. If the vehicle BCM 252 does the decision making, then it sends wireless signals to purge/compress/stop etc. If the TPM/TPCU 228 is the decision making hub, then the BCM 252 just sends the target set pressure and the TPCU makes the decision to purge/pump etc. Both configurations are contemplated by the present disclosure.

Figure 7:
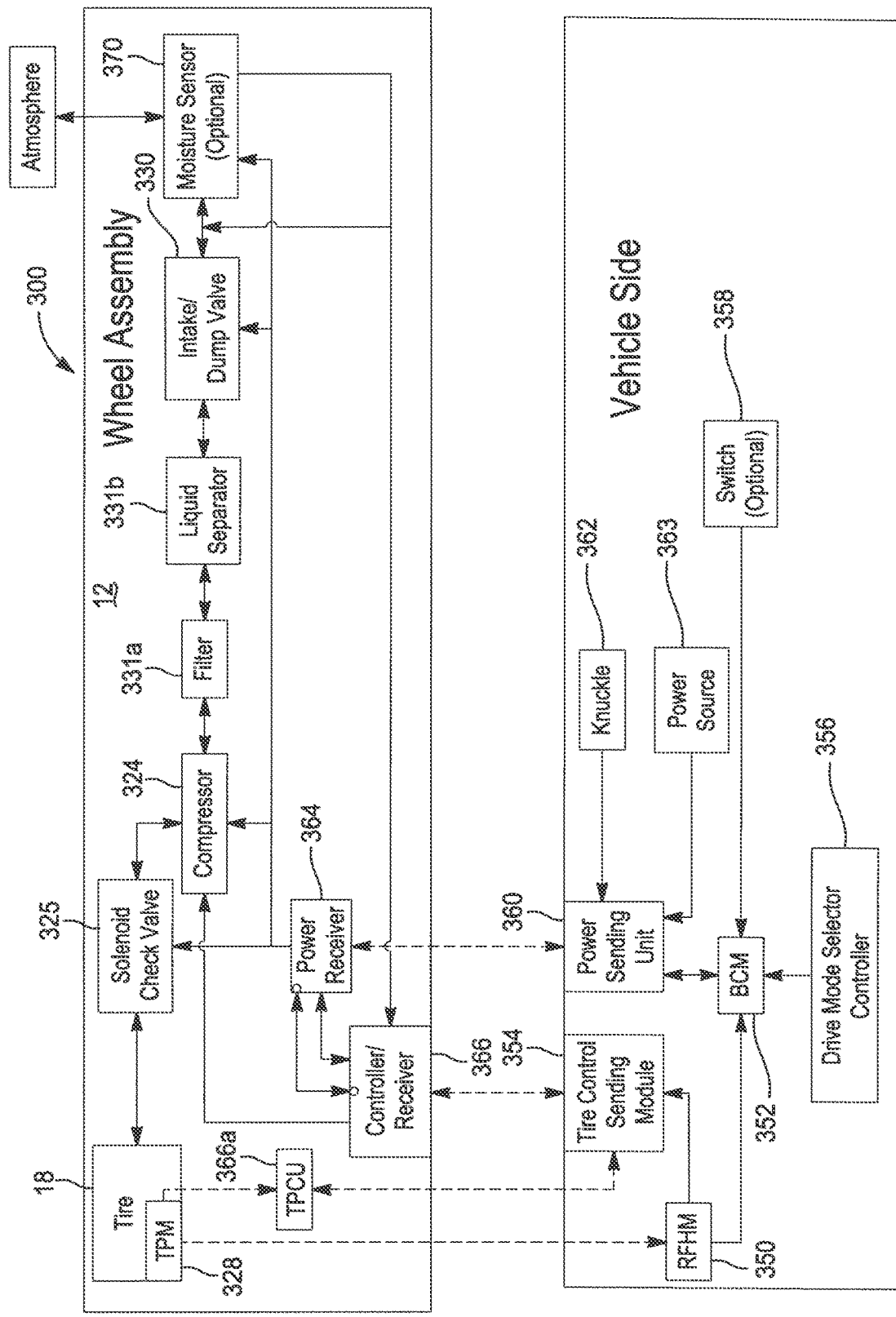
FIG. 7 is a high level block diagram of another embodiment of an in-wheel inflation system of the present disclosure in which the TPCU is an independent component and wirelessly communicates with the TPM and a tire control sending module.

Referring to FIG. 7, system 300 is shown in accordance with another embodiment of the present disclosure. The system 300 is somewhat similar to the system 200, and components in common with those used to describe the system 200 have been increased by 100 in FIG. 7. For example, while switch 358 is not described below relative to FIG. 7, it should be understood that switch 358 is similar to switch 258 described above. One important difference with the system 300, however, is that the communication method between the wheel and tire does not use the Bluetooth® based A4WP wireless communication protocol (used by the wireless power devices) that the embodiment of FIG. 6 may use. With the system 300, a standard radio frequency protocol may be used that does not bypass completely the wireless communication protocol available from the wireless power system.

The system 300 similarly includes a controller/receiver 366 which communicates wirelessly, for example via a A4WP protocol, with an independent tire control sending module ("TCSM") 354. In this embodiment, the TCSM 354 is located on the vehicle remote from the wheel 12. The controller/receiver 366 communicates with, and receives power from, a power receiver 364. The power receiver 364 supplies power to a micro air compressor 324, an electronic solenoid check valve 325, an intake/dump valve 330 and a moisture sensor 370. A liquid separator 331b and a filter 331a are also included for filtering the air and removing moisture from the air fed into the air compressor 324. A tire pressure monitoring ("TPM") sensor 328 on the wheel 12 also communicates wirelessly with an RFHUB 350 located on the vehicle 14 remote from the wheel, and well as wirelessly with an independent tire pressure control unit ("TPCU") 366a located on the wheel 12. The TPCU 366a communicates wirelessly with the TCSM 354. A BCM 352 communicates with the RFHUB 350, a drive mode selector controller 356 an optional switch 358 and a PSU 360. The PSU 360 may be mounted at any convenient location on the vehicle 14, but one particularly preferred location is the steering knuckle 362. A power source 363 may supply DC power the PSU 360, for example +12VDC.

The system 300 thus differs from the system 200 primarily in that the TCSM 354 is located on the vehicle 14 remote from the wheel 12, a separate wheel mounted TPCU 366a is in wireless communication with the TPM 328, and there is no separate TPM/TPCU integrated into the wheel mounted controller/receiver 366. An important difference is that the system 300 does not use the A4WP protocol from the wireless power system driven by the Bluetooth® communications protocol frequency. In this case the system 300 communicates via a different radio frequency and bypasses the power unit and receiver altogether from a communications standpoint. While this approach may not be as desirable as the previously described approaches, it is still feasible and may address the concern that the Bluetooth communications protocol frequencies may not be sufficiently fast to deal with the Doppler effect caused by a wheel spinning at a high rate.

Figure 8:
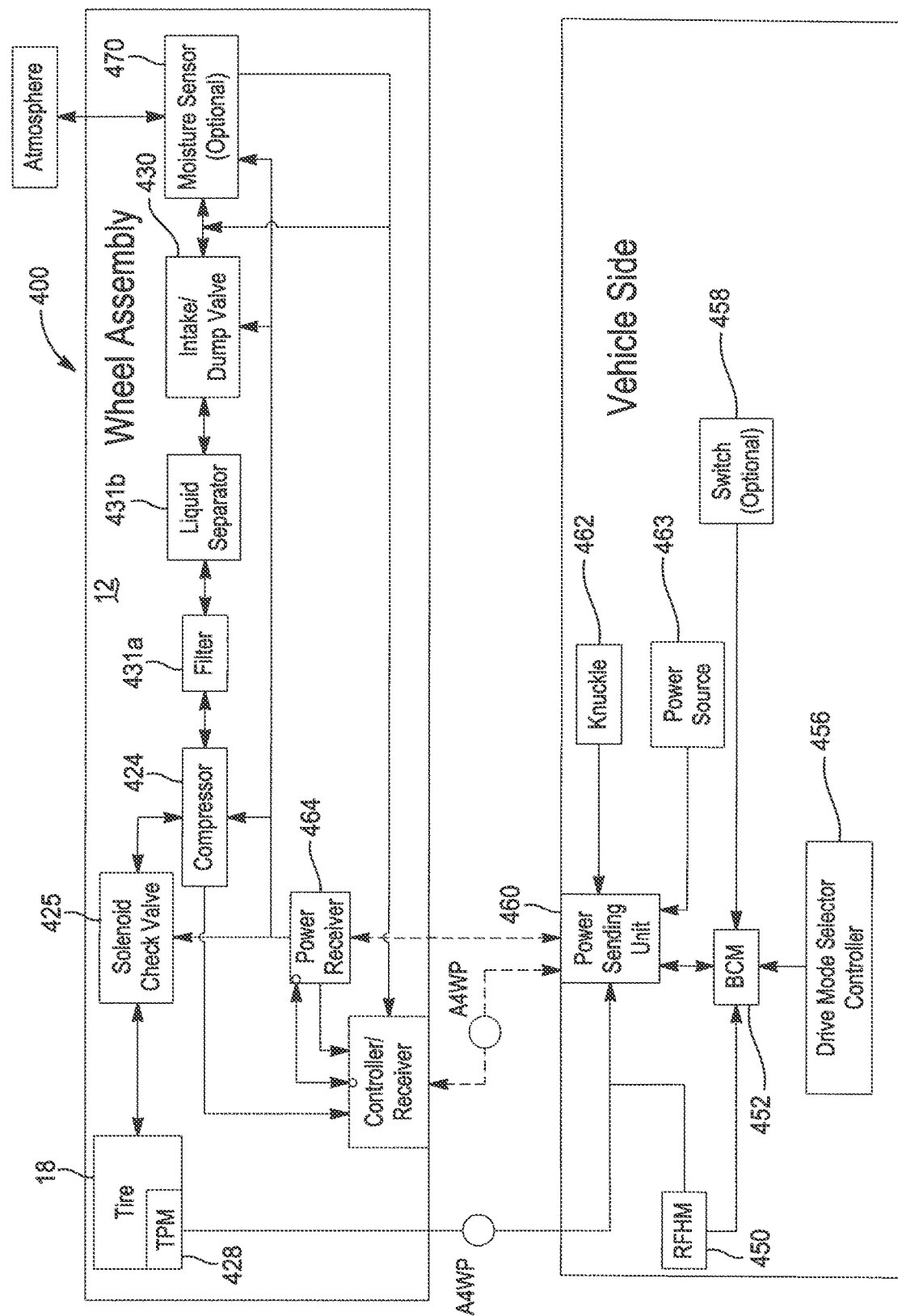
FIG. 8 is a high level block diagram of another embodiment of an in-wheel inflation system of the present disclosure in which the TPCU communicates wirelessly with a power sending unit, while communicating via a wired connection with a controller/receiver mounted on the wheel.

Referring to FIG. 8, a system 400 in accordance with another embodiment of the present disclosure is shown. The system 400 is somewhat similar to the systems 200 and 300, and components in common with those of the system have been denoted in FIG. 8 with reference numbers increased by 100 over those used to describe the system 300. For example, while switch 458 is not described below relative to FIG. 8, it should be understood that switch 458 is similar to switches 258 and 358 described above.

The system 400 differs principally from the system 300 in that a TPM 428 is in wireless communications with a vehicle mounted PSU 460 to receive power from the PSU 460. The wireless communications protocol may be an A4WP wireless protocol or any other suitable protocol may be used. The TPCU is not needed in this embodiment; in this embodiment the TPM 428 replaces the TPCU. The existing TPM 428 is used to communicate back to the PSU 460 on the vehicle. While this configuration requires the system 400 to assume meeting present day regulatory requirements, it nevertheless does reduce costs because the system 400 can be implemented with one less wireless sensor.

The system 400 similarly makes use of a power receiver 464, an electronic solenoid check valve 425, a micro air compressor 424, an air filter 431a, a liquid separator 431b, an intake/dump valve 430 and a moisture sensor 470. The vehicle 14 may similarly carry an RFHUB 450, a BCM 452, the PSU 460, and a drive mode selector controller 456. A DC power source (e.g., +12VDC) 463 such as the vehicle 14 battery may be used to power the PSU 460. The PSU 460 may be mounted at any convenient location, but in one implementation is mounted on a steering knuckle 462.

Air Filtration

Figure 9:
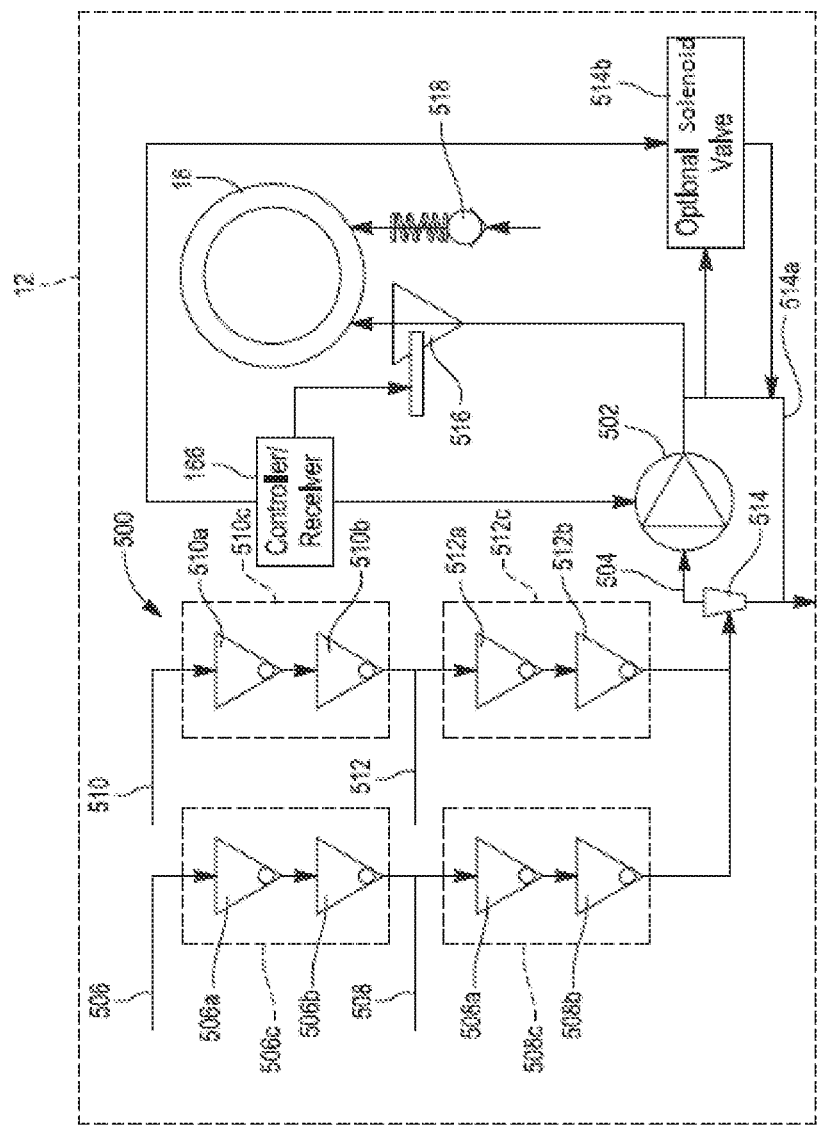
FIG. 9 is a high level block diagram of an air induction system in accordance with one embodiment of the present disclosure, which is well suited for supplying highly filtered air to an air intake port of wheel mounted rotary micro air compressor.

Air Filtration for the input of the micro rotary air compressors is a significant challenge that is addressed by an air induction/filtration system 500 in accordance with one embodiment of the present disclosure, as shown in FIG. 9. The air induction/filtration system 500 (hereinafter simply "air filtration system 500") forms a system able to block the entry of contaminants, water, mud, snow, etc., into an input 504 of a micro-rotary air compressor 502. If a blockage should temporarily arise in the air intake port 504, the system 500 has additional capability of unclogging the blockage. The blockage may be unclogged via a back purge of the system 500 and/or by physical disassembly of the filtration system 500 and cleaning it with a suitable implement. Accordingly, it is an important feature that the air induction portion of the system 500 is serviceable without removing the wheel 12 from the vehicle and with a minimal number of additional/special tools.

It is envisioned that the flow channels, to be described in the following paragraphs, may be formed using a clam shell construction, so that one-half may be removed for cleaning and removing any possible clogged flow passages, and then simply reattaching the two clam shell pieces, for example through a snap fit construction.

The system 500 may incorporate a plurality of one-way float valves 506a/506b associated with a first independent air intake port 506, a second plurality of one-way float valves 508a/508b associated with an independent second air intake port 508, a third plurality of one-way float valves 510a/510b associated with an independent third air intake port 510, and a fourth plurality of one-way float valves associated with an independent fourth intake port 512. The one-way float valves 506a/506b may form a tortuous circuit 506c which is in series with a tortuous circuit 508c formed by one-way float valves 508a/508b. The one-way float valves 510a/510b may form a tortuous circuit 510c which is in series with a tortuous circuit 512d formed by one-way float valves 512a/512b. By "tortuous" it is meant a non-linear or non-straight flow circuit. The tortuous flow paths in this example are formed by turning the flow paths in different directions so that if a clog should occur, it is highly likely to occur before it enters the compressor air inlet 504. In this regard, it will be appreciated that the air intake ports 506, 508, 510 and 512 may be formed with one or more turns or bends to introduce a non-linear (e.g., serpentine) flow path even before the ingested air enters the one-way float valves 506a, 508a, 510a and 512a.

Figure 10:
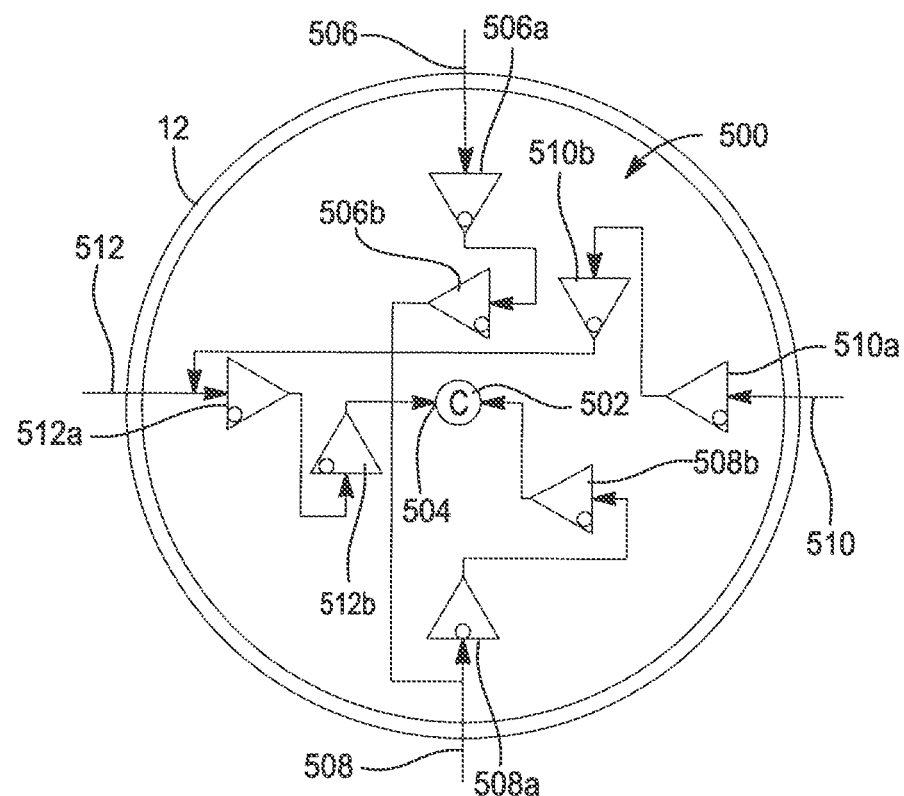
FIG. 10 is a view showing the float valves of FIG. 9 arranged in a tortuous path at different angular locations on the wheel, and with a float valve element of each of the float valves in the position which it would assume with the wheel in the static position as shown in the Figure.

Circuits 508c and 512c may be coupled in parallel prior to the air compressor inlet 504, or they may be coupled to a pair of inlets 504a/504b as shown in FIG. 10. Optionally, a vortex filter 514 may be interposed between the air compressor inlet 504 and the circuits 508c and 512c. Optionally, the vortex filter 514 may be replaced with a plurality of filters arranged in an array of series and/or parallel combinations, depending on packaging considerations and air purity considerations.

A solenoid valve 516 may be controlled to operate as a one-way valve to allow air to be admitted into the tire 18, or alternatively to allow a controlled amount of air to be discharged from the tire 18 for the purpose of forcibly blowing out the circuits 506c/508c/510c/512c to remove a blockage. A standard one-way air intake valve stem (i.e., valve) 518 may be used to allow the tire 18 to be inflated manually using a remote compressed air source, as well as deflated manually by a user.

Figure 9A:
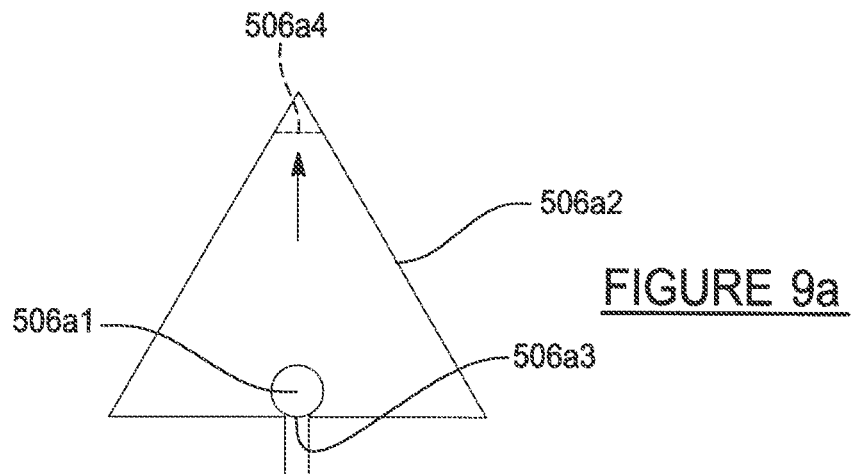
FIG. 9a is more detailed view of one of the float valves.

Referring to FIG. 9a, float valve 506a is shown in greater detail, although it will be understood that in this embodiment the float valves 506a/506b/508a/508b/510a/510b/512a/512b are all identical in construction. The float valve 506a may include a ball float valve element 506a1 that is captured in a pyramid-like cage 506a2. An inlet 506a3 is present at one end of the cage 506a2, and an outlet 506a4 is present at the other end of the cage. 506a2. The float valve element 506a1 may be buoyant in water, and thus in FIG. 9a would rise in the event the interior of the cage 506a2 fills sufficiently with water. As the cage becomes almost completely full with water, the float valve element 506a1 will engage the outlet 506a4 to close off the flow path through the float valve 506a. With this design, it will be appreciated that gravity can also cause the float valve element 506a1 to close off the outlet 506a4 if the float valve 506a is rotated 180 degrees from the presentation shown in FIG. 9a so that the inlet 506a4 is facing down.

FIG. 10 illustrates the system 500 in greater detail configured on the wheel 12, with the wheel stationary (i.e., static). In this example the specific orientations of the float valves 506a/506b/508a/508b/510a/510b/512a/512b relative to a center of the wheel 12 ensures that the system 500 operates during a full 360 degrees of rotation of the wheel—in other words, any orientation that the wheel 12 assumes during its use. The four air inlets 506/508/510/512 are arranged at the 0, 90, 180 and 270 degree points on the wheel 12. The float valves 506a/506b/508a/508b/510a/510b will be open or closed based on gravity, centrifugal force and/or the presence of large slugs of liquids/mud/snow or possibly some other contaminants. In this specific illustration, the arrangements of the float valves 506a/506b/508a/508b/510a/510b/512a/512b, results in float valves 506a and 510b being closed, thus closing off air intake ports 506 and 510. Float valves 506b, 512a, 512b 508a, 508b and 510a are all open. This allows air to be admitted to the compressor air intake port 504a through float valve pair 512a/512b, or through air intake port 504b. Thus, it will be appreciated from FIG. 10 that the tire on the wheel 12 may be inflated while the wheel is stationary regardless of the angular orientation that the wheel 12 is in.

Figure 11:
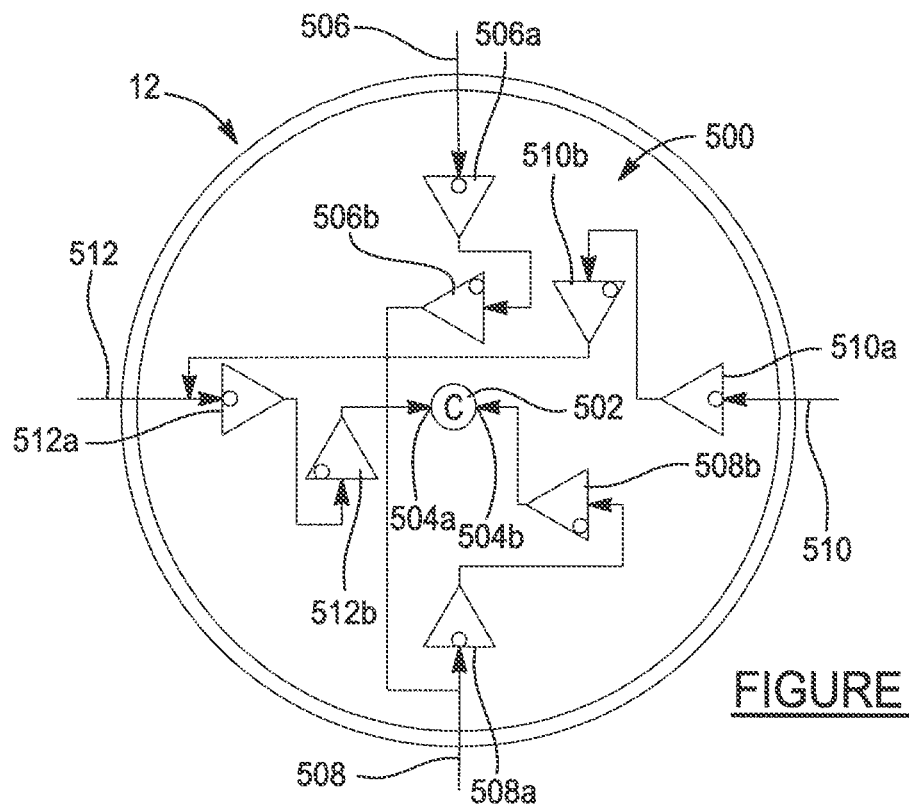
FIG. 11 is a view illustrating the orientations of the float valve elements as the wheel is rotating, illustrating how centrifugal force maintains at least one airflow circuit open to the air compressor at all points of wheel rotation.

FIG. 11 illustrates a "wheel rotating" condition. In this example the centrifugal force experienced by the float valves 506a/506b/508a/508b/510a/510b/512a/512b pushes all of the float valves to their outermost positions, which opens all of the float valves. Air can thus be admitted through any one of the four circuits 506c/508c/510c/512c into the air compressor inlets 504a or 504b.

Figure 12:
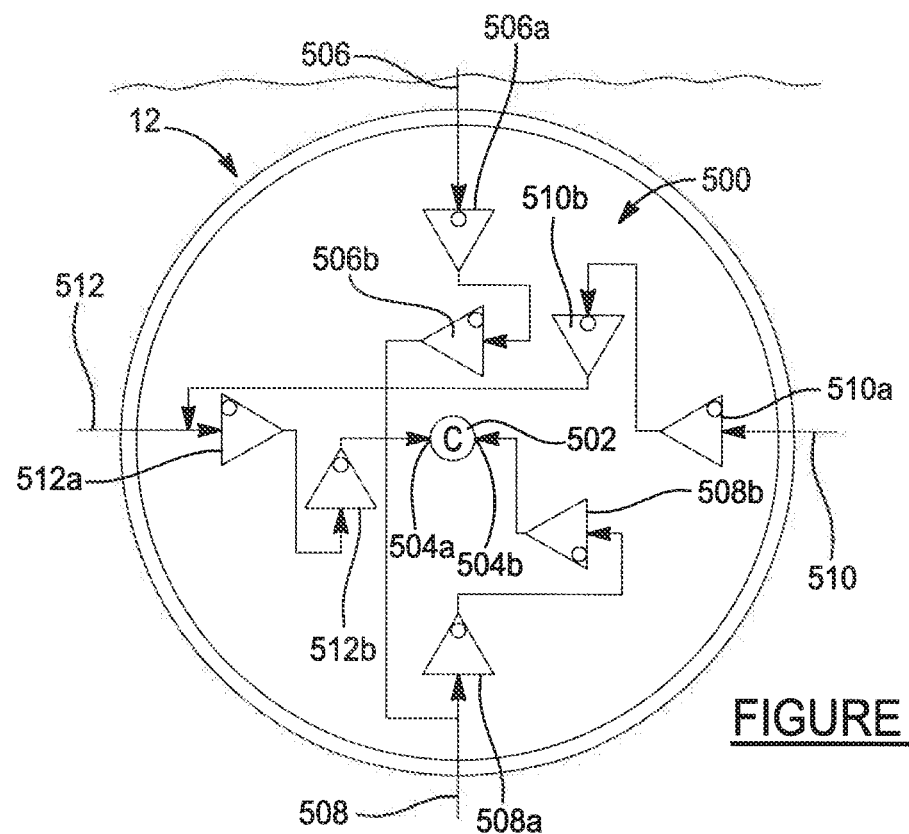
FIG. 12 is a high level block diagram illustrating the orientations of the float valve elements within the float valves when the wheel is fully submerged in water.

FIG. 12 illustrates a condition where the wheel 12 is fully submerged under water. The orientation of the float valves 506a/506b/508a/508b/510a/510b/512a/512b are such that valve 512b is closed by the buoyancy of its float valve element (i.e., float ball), thus closing off the compressor air intake port 504a. Float valve 508a is also closed off as a result of its float valve element blocking airflow into the air compressor intake port 504b. Thus, no water is able to enter the compressor 502. Regardless of the angular orientation of the wheel 12, at least two of the float valves 506a/506b/508a/508b/510a/510b/512a/512b will be blocking the compressor air intake ports 504a/504b.

It will be appreciated that for the system 500, appropriate attention may be important to size the float ball elements of the float valves 506a/506b/508a/508b/510a/510b/512a/512b relative to their respective flow ports to ensure that regardless of the orientation of the wheel 12, the system 500 will be able to close all of the float valves when the wheel 12 is fully submerged in water, regardless if the wheel is stationary or rotating. Optionally, additional circuits, for example placed at select locations between the 90,180,270, 360 points of the wheel 12 may be included.

Vortex Filtration of Fine Debris

The vortex filter 514 shown in FIG. 9 is optional, but it is believed that in most applications it will be valuable for filtering dust and debris and helping to maintain the air compressor intake port(s) 504a/504b clear of dust and debris. The vortex filter 514 in this example may vary significantly in size depending on the wheel 12 size and also possibly on the size(s) of tire that may be used on the wheel 12, but in one embodiment is about 0.25 inch (6.35 mm) in diameter and about 1.0 inch (25.4 mm) in overall length. These dimensions for the vortex filter 514 enable airflow rates sufficient to fill a tire mounted on a 20 inch (50.8 cm) wheel from 15 psi to 34 psi in about 15 minutes or less. Optionally, a plurality of the vortex filters 514 could be configured in parallel or in series to reduce size and/or increase filter efficiency. Sizing considerations for the vortex filter 514 are also that the vortex filter should preferably provide about 0.25 CFM and have a separation efficiency of preferably about 99% or greater for most particles over 2 microns in diameter. This would enable the vortex filter 514 to capture all but extremely fine dust particles. Ideally the pressure drop created by including the vortex filter 514 should be no more than about 0.35 psi across the operating range of the air compressor 502.

If the vortex filter 514 is included, then it may be helpful to provide a bleed off of about one percent of the downstream air compressor 502 flow to help eject dust, water and other particles from the vortex separator. This may be accomplished by plumbing a portion of the downstream output of the air compressor 502 into communication with a bottom portion of the vortex filter 514, as indicated by line 514a in FIG. 9. Optionally, an additional valve, for example an additional electronic solenoid valve 514b, may be included which is controlled by the controller/receiver 166, to periodically allow a short pulse of compressed air from the output side of the air compressor 502 to a dust/dirt particulate discharge side of the vortex filter 514 to help clear any mud, dust or dirt particulates from an interior area of the vortex filter. The optional air flow pulse may also help to improve the cleaning efficiency of the vortex filter 514. The solenoid valve 514b helps to prevent water from bypassing the air filtration system 500 and going straight past the compressor via the vortex rejection port (to atmosphere) in case the system 500 is flooded. It will also be appreciated that the vortex filter 514 works independently of gravity and has no moving parts. Typically, the vortex filter 514 may be made from plastic, and therefore adds very little mass to a rotating wheel.

And while the system 500 has been illustrated as being used to control and filter airflow into a rotary micro compressor, it will be appreciated that the system 500 may be adapted for use with other electromechanical components besides a rotary micro compressor. Potentially any electromechanical component requiring a clean airflow, which is mounted on the wheel, may benefit from the system 500 with little or no modifications to the system 500. And while the system 500 has been shown configured to ingest ambient air, the system 500 may potentially be used to control the admission of other compressible fluids (e.g., nitrogen) to one or more components mounted on the wheel.

Component Locations

Figure 13:
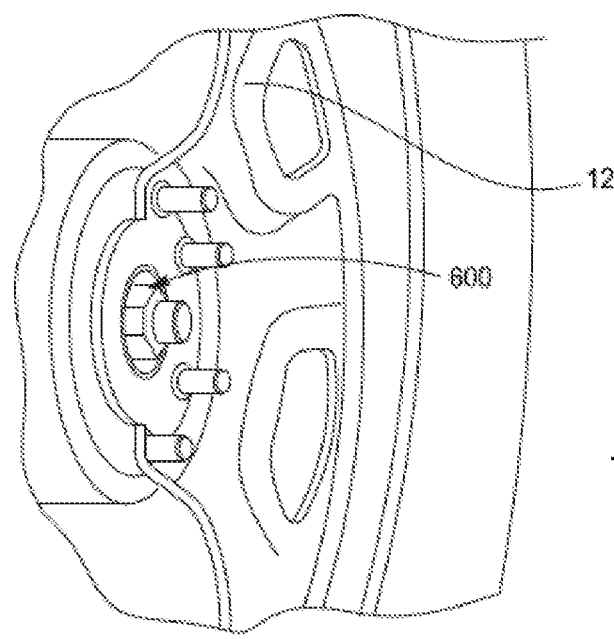
FIG. 13 is a simplified perspective view of portion of the wheel illustrating one possible mounting location for the air compressor.
Figure 14:
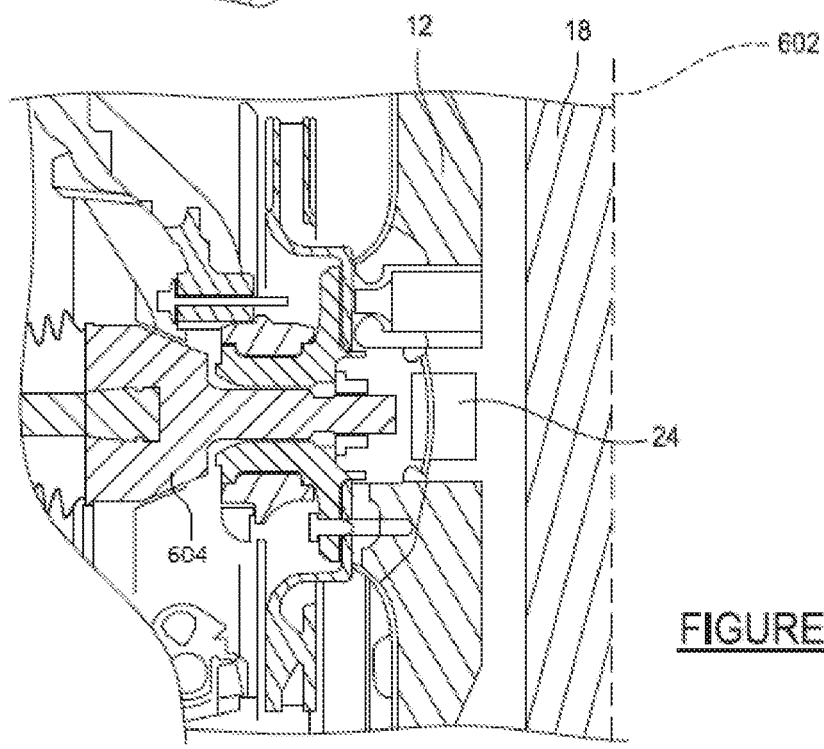
FIG. 14 is a simplified view illustrating a preferred clearance from the air compressor to a stone line defined by an outer sidewall of the tire.

Referring to FIGS. 13 and 14, in one preferred implementation the air compressor (e.g., air compressor 24) may be located within a center cap region 600 of the wheel 12. Preferably, the compressor 24 is mounted so that it does not protrude out beyond a stone line 602 of the tire 18. The air compressor should also be spaced apart from an end of a half shaft 604 driving the wheel 12 by at least a small amount.

Additional mounting considerations are also the spacing from a brake caliber, which is preferably at least 10 mm or so. Clearance from the drop well zone of the wheel 12 is also important, as is keeping components of the various embodiments described herein clear of the wheel balance zones of the wheel 12. The various embodiments disclosed herein are also preferably integrated into a single assembly which can be secured to and detached from the wheel 12, and more preferably from the front (i.e., outside) of the wheel, quickly and easily for service if needed. Connections with the air compressor 24, 502, etc. described herein also preferably are of the quick/connect type. Preferably, the various embodiments disclosed herein are also serviceable/accessible without the need to remove the wheel 12 from the vehicle 14.

It will also be appreciated that it will be preferred to avoid mounting components of the system 500, as well as the compressor 502 and the vortex air filter 514, at specific locations of the wheel 12 where these components may interfere with other needed components. For example, maintaining a sufficient clearance from a brake caliper, for example possibly at least about 10 mm will be preferred. The stone line 602, as noted hereinbefore, also demarcates a line beyond which no component of the system 500 should protrude. Wheel balance zones also define areas where preferably no components of the system 500 will be located.

Examples of Implementation Details

Figure 15:
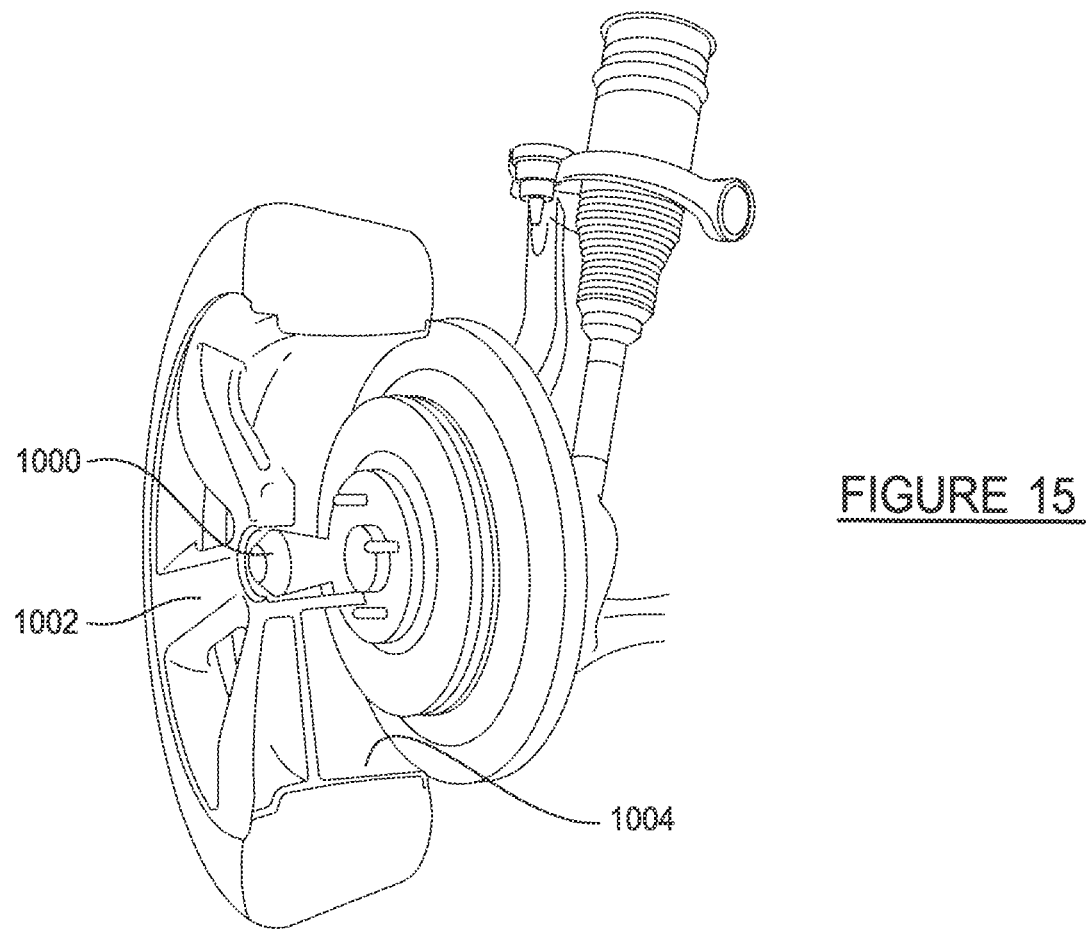
FIG. 15 is a perspective view of a portion of a wheel/tire combination showing a preferred location of the micro air compressor of the in-wheel inflation system.

FIG. 15 illustrates a micro air compressor 1000 that may be mounted between lugs on a wheel 1002 at a radial center of the wheel 1002. FIG. 15 also illustrates a wireless charging receiver ring 1004 mounted adjacent an inside edge of the wheel 1002, which may be able to inductively receive power from a fixedly mounted component remote from the wheel 1002.

Figure 16:
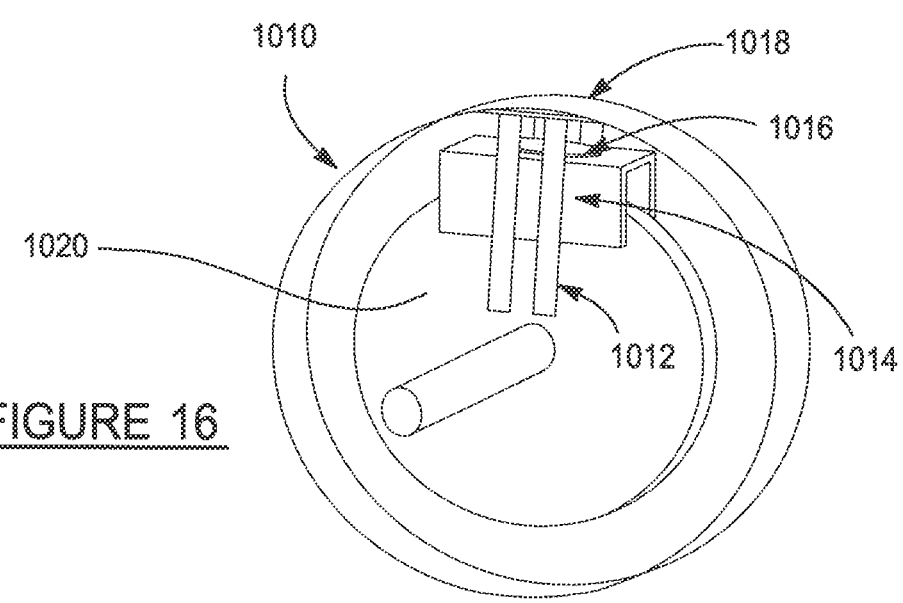
FIG. 16 is a high level diagram illustrating how various components of a wireless (I.e., inductive) power transfer system may be integrated in relation to a brake rotor and axle of a vehicle.

FIG. 16 further illustrates a high level diagram showing components of an inductive charging system 1010 for supplying electrical power to components mounted on the wheel 1002. The system 1010 in this example forms a wireless charging/sending unit that may make use of one or more spokes positioned on a false caliper 1014. The false caliper 1014 may support a source coil 1016 (e.g., 1 mm thick printed copper coil) thereon and formed to be generally perpendicular to the spokes 1012 and electrically coupled to the spokes 1012. A receiver coil 1018 may be positioned on the wheel 1002 adjacent an inside wall of the wheel, such as shown with receiver ring 1004. The false caliper 1014 may be mounted to a steering knuckle of the vehicle, in a similar manner to how a dust shield might be supported over a rotor 1020. The rotor 1020 is thus free to rotate without interference from the false caliper 1014 and the spokes 1012.

Figure 17:
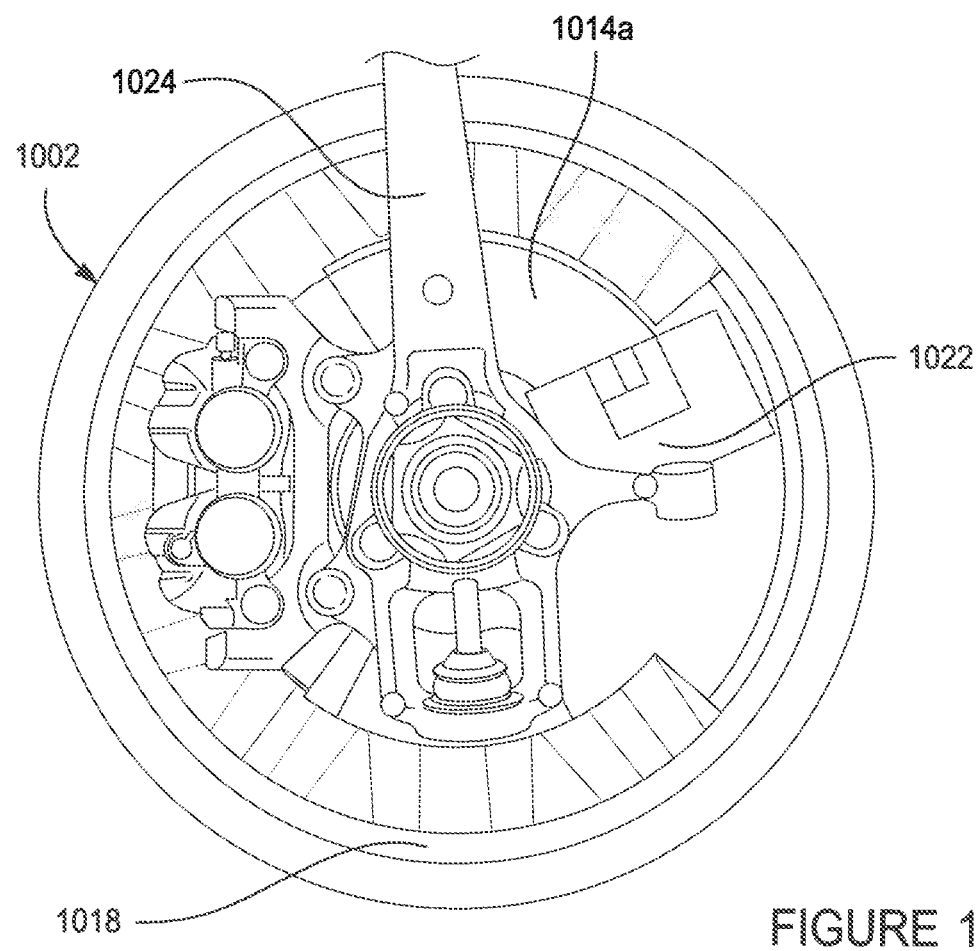
FIG. 17 is a high level illustration further showing how various components of the wireless power transfer system may be integrated onto a wheel of a vehicle.
Figure 18:
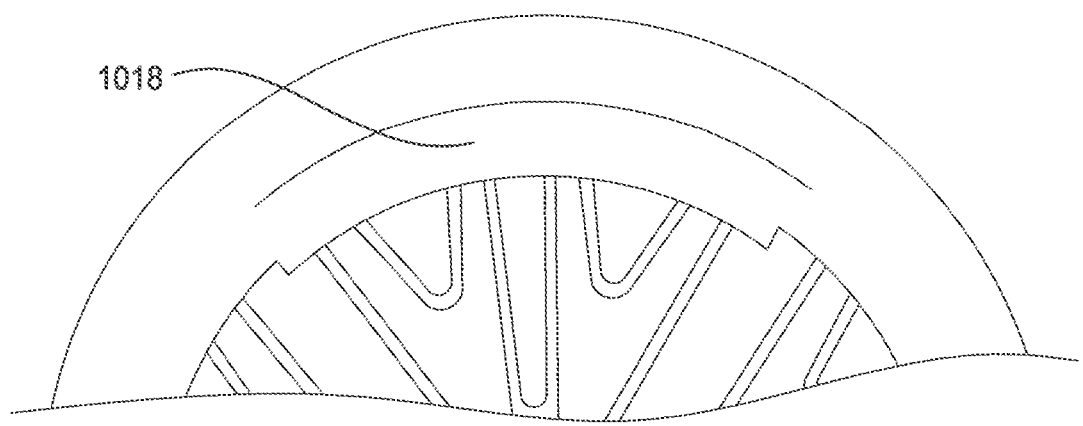
FIG. 18 shows a portion of an inside of a wheel to better illustrate one preferred mounting location for a sending unit of the wireless power transfer system on the wheel.

FIG. 17 further illustrates a more detailed example of the wheel 1002. In this example a modified dust shield 1014a acts as the false caliper and may support parts or all of the circuit board assembly forming a receiver coil transceiver unit 1022 fixedly thereon. However, it is preferred that at least portions, or more preferably all, of the circuit board be decoupled from this harsh environment area and relocated into a less harsh environment area of the vehicle. The modified dust shield 1014a may be mounted to a steering knuckle 1024. FIG. 18 illustrate a portion of the receiver 1018 extending along an inside portion of the wheel 1002. FIG. 19 shows an enlarged view of just the modified dust shield 1014a. The source coil 1016 is fixedly secured to a frame portion 1026 of the modified dust shield 1014a and may be covered with a protective cover 1028, for example a plastic cover, that is molded over or otherwise securely attached to the frame portion 1026. The protective cover 1028 also should be constructed from a non-ferrous material.

FIGS. 20-21 illustrate additional details on the construction of the receiver coil 1018 and the source coil 1016. The receiver coil 1018 in one example may be formed using a single turn of conductive wire (or alternatively multiple turns) of, for example 90 mm×1564 mm, while the source coil 1016 may be formed using a 90 mm×300 mm single length of conductive wire. FIG. 21 shows that when the receiver coil 1018 is bent or formed into a circular configuration for placement on an inside edge area of the wheel 1002, there exists a gap 1030 between the free facing ends of the receiver coil 1018. In one example this gap may be about 32 mm, and may be referred to as "receiver coil gap" 1030. FIG. 22 illustrates that the receiver coil gap 1030 is sufficient to accommodate the receiver coil transceiver unit 1022. The receiver coil transceiver unit 1022 may also be embedded or enclosed with a protective plastic casing and may rest within the receiver coil gap 1030 such that it is generally flush with the outer surface contour of the plastic casing 1028 (FIG. 19) covering or enclosing the receiver coil 1018.

FIG. 23 shows one example of a cross-sectional portion of a 20" wheel to illustrate the clearances that the receiver coil 1018 and source coil 16 configurations provide. Both the receiver coil 1018 and the receiver coil transceiver unit 1022 have a width in this example of 90 mm, indicated by dimensional indicator 1032, which leaves a gap of 20 mm-30 mm, as denoted by dimensional indicator 1034. Areas 1036 represent rotational volumes which may be reserved for wheel weights. As such there is ample clearance between the receiver coil 1018 and the receiver coil transceiver unit 1022 from any components associated with the wheel or from components mounted on the steering knuckle 1024 (FIG. 17). It will also be noted that the mounting of the receiver coil 1018, the source coil 1016 and the receiver coil transceiver unit 1022 on the wheel 1002 do not interfere with the wheel balance zones or drop zones of the wheel 1002, or with minimum clearances desired for the brake caliper, and none of these components comes close to projecting to the stone line of a tire mounted to the wheel 1002.

Referring to FIG. 24, one example of preferred packaging zones 1038 and 1040 are shown for a 5 spoke wheel 1042, while looking at a cross section of the wheel 1042 from a front side (i.e., outwardly facing side). FIG. 25 shows the preferred packaging zones 1038 and 1040 for the wheel 1042 when looking at a cross-section of the wheel from the rear side (i.e., inside facing the steering knuckle).

Figure 26:
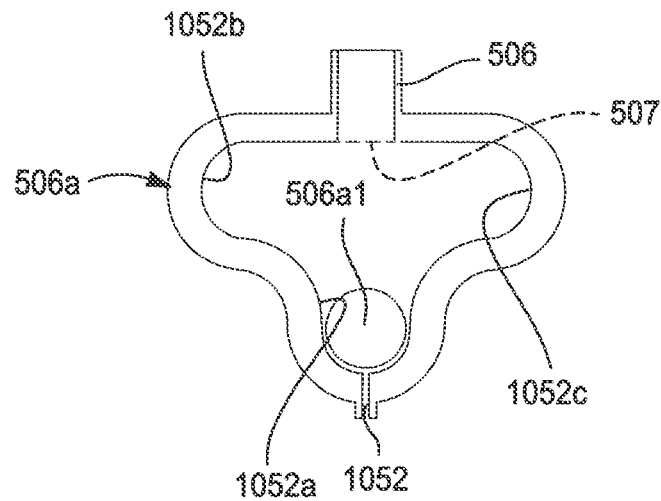
FIG. 26 illustrates a front view of one of the float valves illustrating how pockets may be formed in three distinct locations to capture and hold the float ball, depending on the angular orientation of the wheel.
Figure 27:
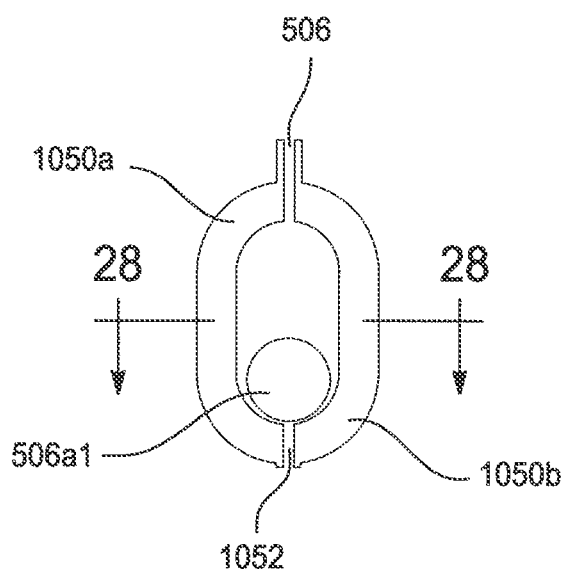
FIG. 27 shows a cross-sectional side view of the float valve of FIG. 26.
Figure 28:
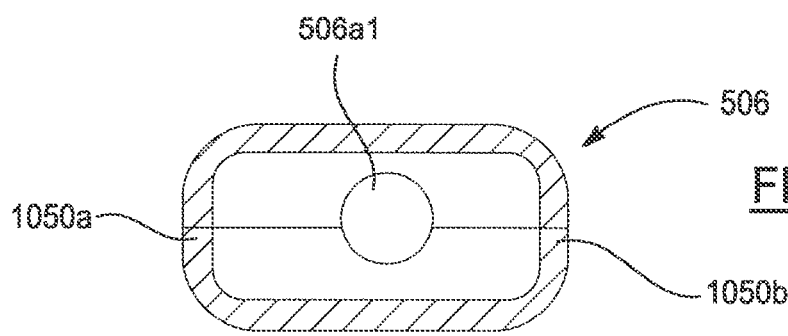
FIG. 28 shows a top, simplified cross sectional view of the float valve of FIG. 27.

Referring to FIGS. 26-28, various views of the float valve 506a are shown to illustrate in greater one example of a detailed construction for each of the float valves 506, 508,510 and 512 and the filter system 500 as a whole. Each of the float valves 506a/506b, 508a/508b, 510a/510b, and 512a/512b. The float valve 506a may be formed from two halves 1050a and 1050b in a clamshell-like configuration, as shown in FIG. 27 and in the top cross-sectional view of FIG. 28, to enable easy assembly and capture of the float ball 506a1 therein. An outlet 1052 is formed opposite to the inlet 506. A screen 507 may be placed over the opening of the inlet 506 which leads to the interior of the float valve 506a. The halves 1050a and 1050b may also be formed with three pockets 1052a, 1052b and 1052c which are dimensioned to be able to hold the float ball 506a1 therein depending on an angular orientation of the float valve 506a.

Figure 37:
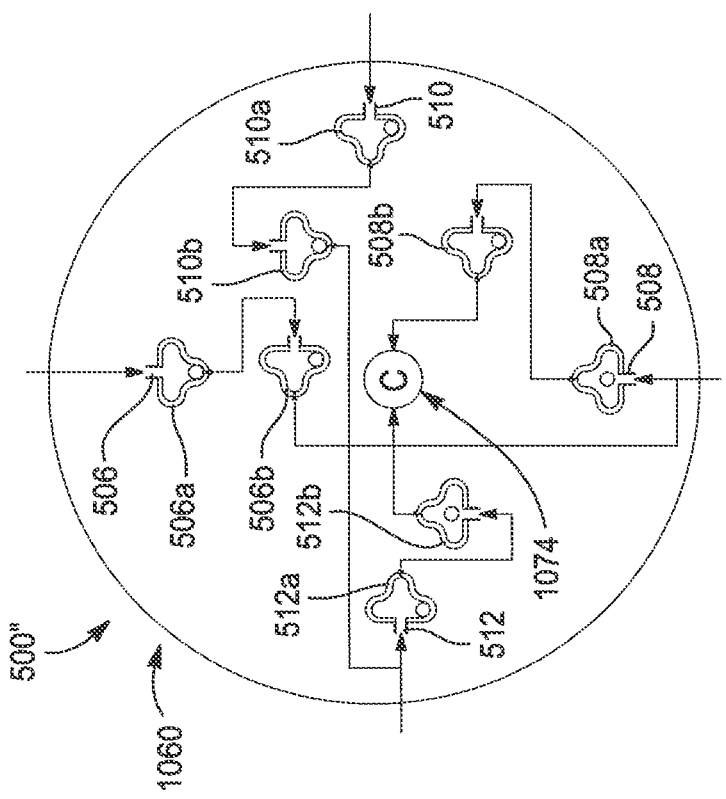
FIG. 37 is a schematic diagram of an air induction system similar to that shown in FIG. 10 but incorporating the float valve design shown in FIG. 26.

FIGS. 29-32 illustrate how the float ball 506a1 initially blocks the outlet 1052a but eventually falls into the pocket 1052c during clockwise rotation of the valve 506a. FIGS. 33-36 further illustrate how the float ball 506a1 rolls over the screen 507 and into the pocket 1052b as clockwise rotation of the float valve 506 continues. FIG. 37 illustrates the valves 506a,506b, 508a,508b 510a,510b and 512a,512b in relation to their respective positions on a wheel 1060, similar to what is shown in FIG. 10. The orientations of the float valves pairs 506a/506b, 508a/508b, 510a/510b and 512a/512b help to block the flow of fluids into the compressor inlets should the wheel 1060 become partially or fully submerged in water.

Figure 38:
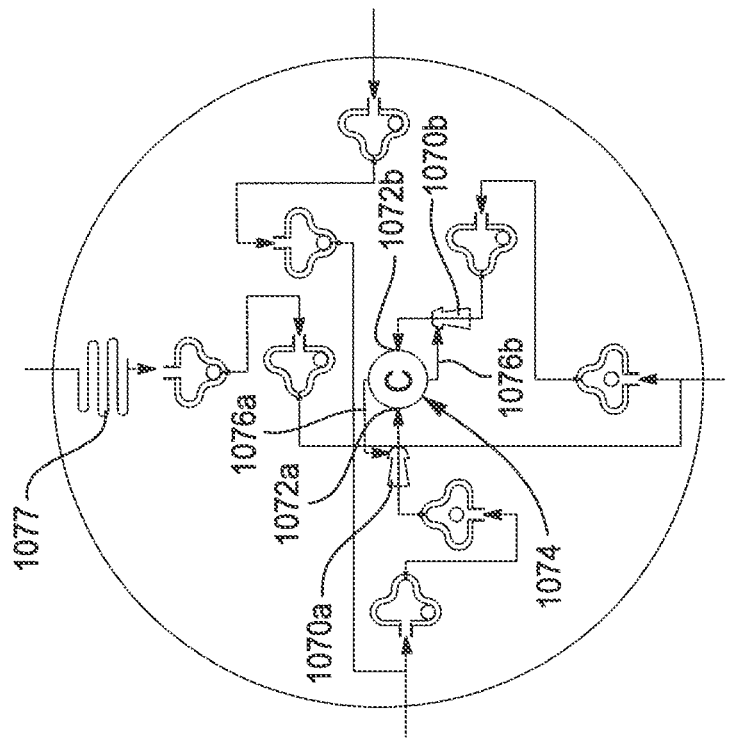
FIG. 38 is schematic diagram of another embodiment of the air induction system incorporating a pair of vortex filters at each of the air inlets of the air compressor, as well as at least one serpentine flow path upstream of one of the air inlets, for capturing viscous fluids (e.g., mud) before the viscous fluid makes it one of the float valves.

FIG. 38 illustrates that separate vortex filters 1070a and 1070b may be positioned at inlets 1072a and 1072b to a compressor 1074 mounted on the wheel 1060. A predetermined amount of compressed air from the compressor 1074 may be diverted to each vortex filter 1070a and 1070b via feedback lines 1076a and 1076b to assist the filter 1070a or 1070b in rejecting contaminated air that is drawn in through any one of the inlets 506, 508, 510 or 512. FIG. 38 also illustrates that a tortuous path 1077 (e.g., in one example a serpentine flow path) which may be incorporated upstream of at least one (or possibly all) of the float valves 506a,506b, 508a,508b, 510a,510b and 512a,512b, to positively prevent any incoming viscous material (e.g., mud) from entering its respective float valve.

FIGS. 39-41 further illustrate how the clamshell construction of the air filter system 500 may be implemented. A first clamshell component 1080 may be fixedly mounted to the wheel 1060, while a mating second clamshell component 1082 is removably secured to the first clamshell component 1080 with fasteners 1084. Simply removing the second clamshell component 1082 enables access to the interior areas of both clamshell halves 1080 and 1082 without the need to remove the wheel from the vehicle. Thus, cleaning and/or repair of any of float valves 506a,506b,508a,508b, 510a,510b or 512a,512b may be accomplished quickly and easily, and without the need to even remove the any other components mounted on the wheel (e.g., tire pressure sensors, valve stems, etc.)

FIG. 40 illustrates that a ball valve cage 1086, which permits the flow of air therethrough, may be used to capture the ball valve element therein. The cage 1086 may be shaped to fit within a volume formed within the valve 506a when the two clamshell halves 1080 and 1082 are secured together. FIG. 41 illustrates that, for ease of manufacturing, the first clamshell half 1080 may be formed mostly with a flat surface, and that the second clamshell component 1082 may be formed to include the needed contours to form the pockets 1052a,1052b and 1052c described herein.

FIG. 42 illustrates that the vortex filter 1070a or 1070b of FIG. 38 may also be formed using the two clamshell components 1080 and 1082 shown in FIG. 39. Suitably sized ports 1090a and 1090b may be formed using one or both of the clamshell components 1070a and 1070b to form a dirty air ejection port (port 1090a) and a clean air out port 1090b, as well as an input port 1090c orthogonal to the ports 1090a and 1090b for ingesting dirt-entrained air. It will be appreciated that the dimensions of the ports 1090a, 1090b and 1090c will vary depending on various factors such as required air flow rates and pressures etc. Obviously, larger wheel/tire combinations and/or more powerful systems may require larger diameter port sizes.

The various embodiments of the present disclosure provide the benefit of providing electrical power and electronic communications to the components on the wheel 12 of the vehicle 14 in a fully wireless manner. The various embodiments can be used with wheels of virtually any diameter and width, and regardless of wheel orientation when the wheel is attached to the vehicle 14. A significant advantage is that the various embodiments of the present disclosure will not introduce additional parasitic drag on the wheel 12, unlike many previously designed wheel inflation systems. In addition, the inflation/deflation of each wheel 12 is independently controllable by the various embodiments described herein.

While the various embodiments have been described in connection with an automotive vehicle, it will be appreciated that the various embodiments described herein could just as readily be applied to other wheeled vehicles, for example ATVs, RVs, trailers, motorcycles, earth moving equipment, farm equipment, tractors, etc., and therefore are not limited only to automotive applications.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for controlling admission of a compressible fluid to an electromechanical component mounted on a wheel of a vehicle, the system comprising:

a first plurality of float valves arranged in series in a first flowpath, with at least one of the float valves forming an inlet for intaking the compressible fluid into the first flowpath, and another one of the float valves being in communication with an inlet of the electromechanical component; and each of the float valves having a buoyant float valve element therein responsive to change position when submerged in water to close a flow pathway through the float valve depending on an angular orientation of the wheel, and thus an angular orientation of the float valve.

2. The system of claim 1, wherein the first flowpath including the first plurality of float valves includes four float valves arranged in series in a non-linear path, with one of the four float valves forming a first inlet able to receive the compressible fluid, while another one of the four float valves is in communication with the inlet of the electromechanical component.

3. The system of claim 1, wherein adjacent ones of the first plurality of float valves are rotated so as to be non-parallel from one another in angular orientation.

4. The system of claim 2, further comprising a second flow path including a second plurality of float valves, with one of the second plurality of float valves forming a second inlet for intaking the compressible fluid, and another one of the second plurality of float valves being in communication with the inlet of the electromechanical component.

5. The system of claim 4, wherein two of the float valves of the first plurality of float valves are configured to receive the compressible fluid.

6. The system of claim 5, wherein two of the float valves of the second plurality of float valves are configured to receive the compressible fluid.

7. The system of claim 6, wherein the first and second flow paths are angularly spaced apart from one another, and each float valve in each of the first and second flow paths are angularly offset from one another to form a non-straight path.

8. The system of claim 6, wherein the first and second flow paths collectively include a total of four float valves that are configured to receive the compressible fluid and are each rotated, with respective to an adjacent float valve, by more than 45 degrees around the circumference of the wheel.

9. The system of claim 1, further comprising a filter disposed between the first plurality of float valves and the inlet of the electromechanical component for filtering the compressible medium before the compressible medium enters the inlet of the electromechanical component.

10. A system comprising:
a wheel;
an air compressor mounted on the wheel, the air compressor having an inlet; and
an air induction system mounted on the wheel for controlling an admission of air from an ambient environment into the inlet of the air compressor;
the air induction system including a plurality of float valves fixedly supported on the wheel and arranged in a non-linear flow path such that the admission of air into the wheel rim is blocked when the wheel is submerged in a fluid.

11. The system of claim 10, wherein the air induction system includes a filter for filtering air from the ambient environment prior to the air being admitted into the inlet of the air compressor.

12. The system of claim 11, wherein the float valves are arranged on the wheel to be angularly offset from one another.

13. The system of claim 11, wherein the plurality of float valves and the non-linear flow path includes additional pluralities of float valves forming an additional non-linear flow path, the additional non-linear flow path operating to supply air from the ambient environment to the compressor inlet, and one of the other of the non-linear flow path or the additional non-linear flow path operating to block the flow of air and fluid into the compressor inlet depending on an angular orientation of the wheel.

14. The system of claim 11, the non-linear flow path and the additional non-linear flow path are arranged so as to include portions separated from one another by 90 degrees around a circumference of the wheel.

* * * * *